United States Patent
Maeda et al.

(10) Patent No.: US 8,904,413 B2
(45) Date of Patent: Dec. 2, 2014

(54) MAGAZINE BOX

(71) Applicant: Panasonic Corporation, Osaka (JP)

(72) Inventors: Shinichi Maeda, Osaka (JP); Takuto Yamazaki, Nara (JP); Hiroshi Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/923,586

(22) Filed: Jun. 21, 2013

(65) Prior Publication Data

US 2013/0347012 A1    Dec. 26, 2013

(30) Foreign Application Priority Data

Jun. 22, 2012 (JP) ................................ 2012-140991
Oct. 9, 2012 (JP) ................................ 2012-224596

(51) Int. Cl.
  *G11B 23/03* (2006.01)
  *G11B 17/22* (2006.01)
  *G11B 23/023* (2006.01)

(52) U.S. Cl.
  CPC ............ *G11B 17/228* (2013.01); *G11B 17/221* (2013.01); *G11B 23/0323* (2013.01); *G11B 17/225* (2013.01)
  USPC .......................... 720/610; 720/657; 369/30.54

(58) Field of Classification Search
  CPC ............. G11B 17/225; G11B 15/6835; G11B 23/023; G11B 15/68; G11B 17/22
  USPC ................. 369/30.54; 720/657, 610
  See application file for complete search history.

(56) References Cited

U.S. PATENT DOCUMENTS

| | | | | |
|---|---|---|---|---|
| 7,388,730 B2 * | 6/2008 | Hori | ............................. | 360/92.1 |
| 2012/0237321 A1 * | 9/2012 | Akiyama | ................. | 414/222.02 |
| 2013/0201810 A1 * | 8/2013 | Takahashi | .................. | 369/75.11 |
| 2013/0320827 A1 * | 12/2013 | Manes et al. | .................. | 312/237 |

FOREIGN PATENT DOCUMENTS

| | | | |
|---|---|---|---|
| EP | 709840 A2 | * | 5/1996 |
| EP | 709849 A2 | * | 5/1996 |
| EP | 856844 A1 | * | 8/1998 |
| EP | 1528564 A2 | * | 5/2005 |
| JP | 1-184660 | | 7/1989 |
| JP | 08017126 A | * | 1/1996 |
| JP | 9-35391 | | 2/1997 |
| JP | 2000-117553 | | 4/2000 |
| JP | 2011-204311 | | 10/2011 |

* cited by examiner

*Primary Examiner* — Will J Klimowicz
(74) *Attorney, Agent, or Firm* — Wenderoth, Lind & Ponack, L.L.P.

(57) ABSTRACT

A magazine box is provided for removably storing a plurality of disc-storing magazines used in a disc apparatus for feeding a disc to each of a plurality of disc drives. The magazines each include a tray for storing the disc, a case for removably storing the tray, and a first locking mechanism for releasably locking the tray to the case. The magazine box further includes a second locking mechanism for releasably locking the case of each of the plurality of magazines to the magazine box, and the second locking mechanism maintains the locked state at least during the automatic tray-ejection from the case in the disc apparatus is conducted.

10 Claims, 33 Drawing Sheets

Fig.2D
(a)
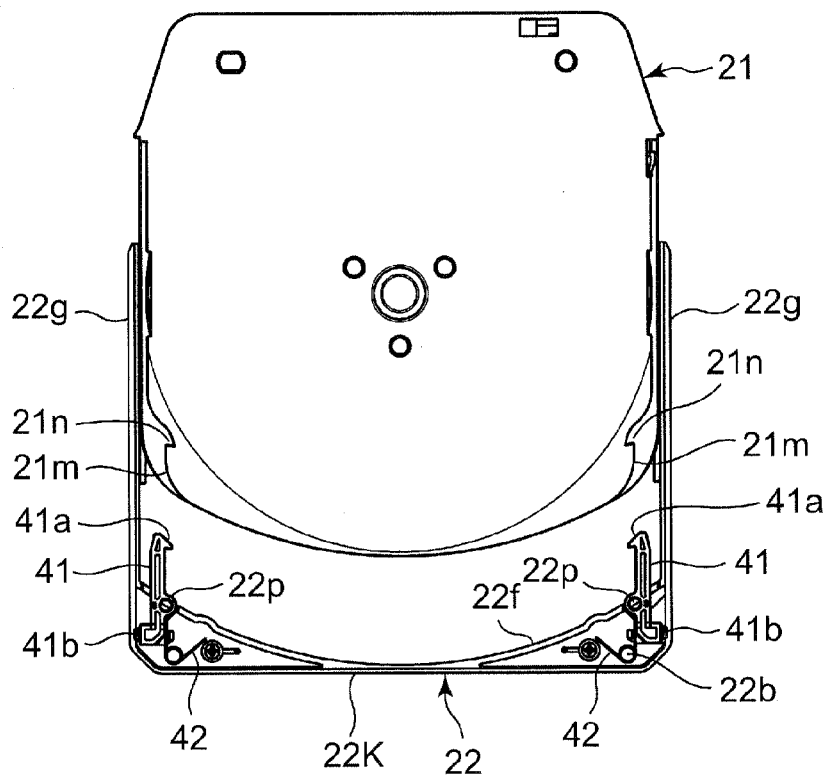
(b)
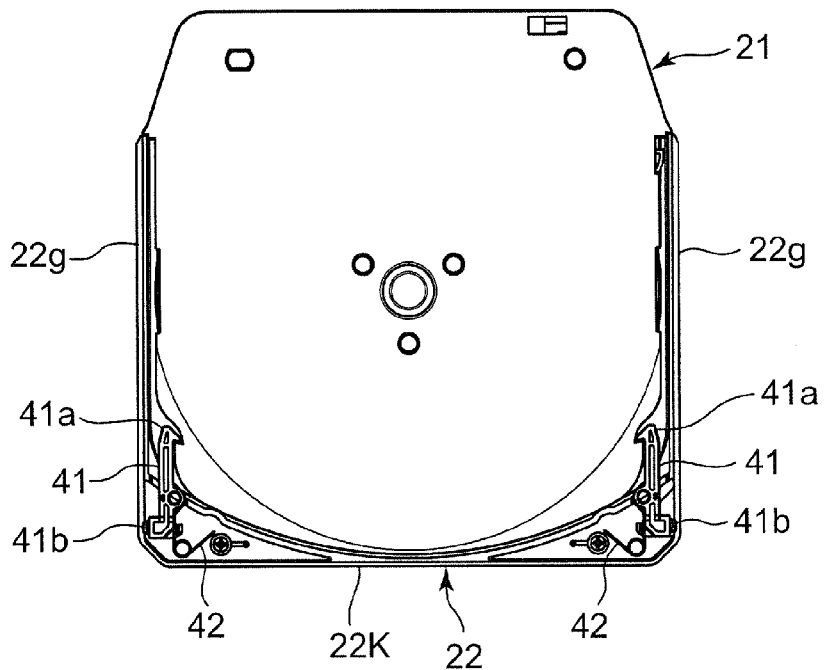

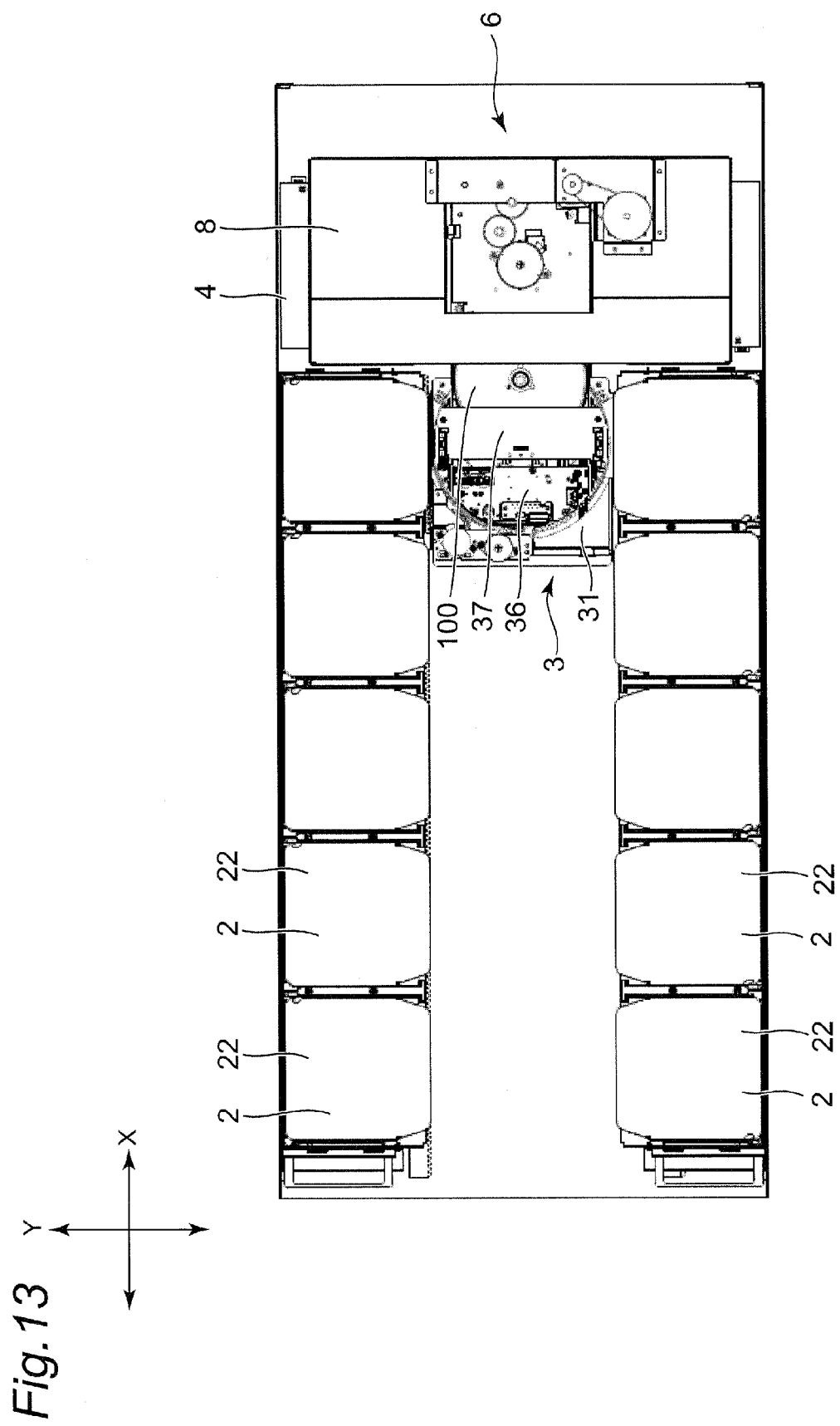

Fig.18A
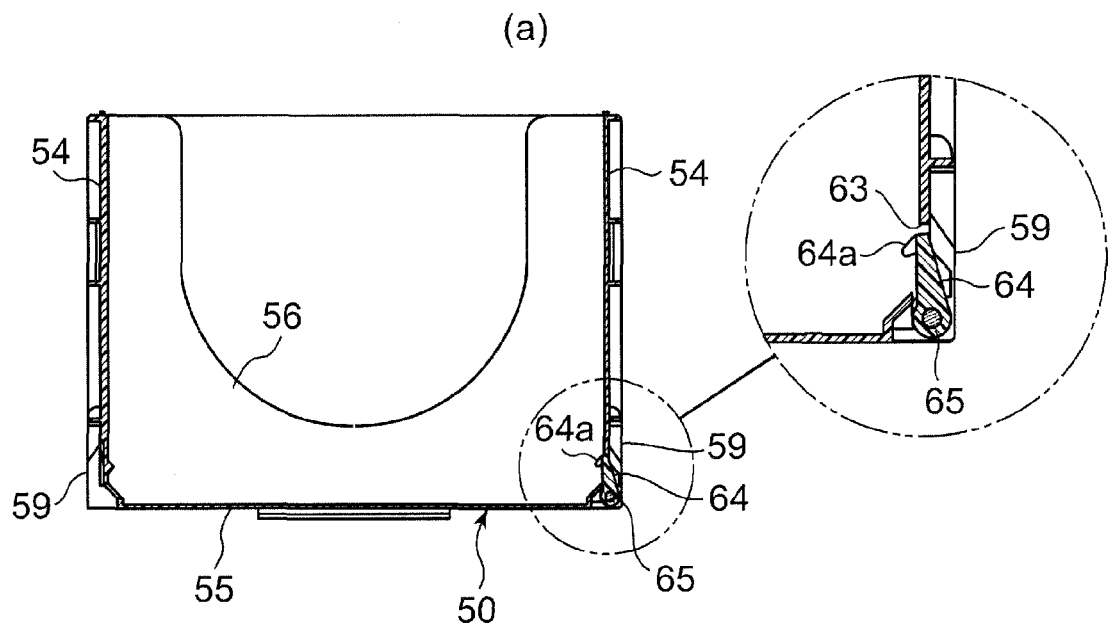
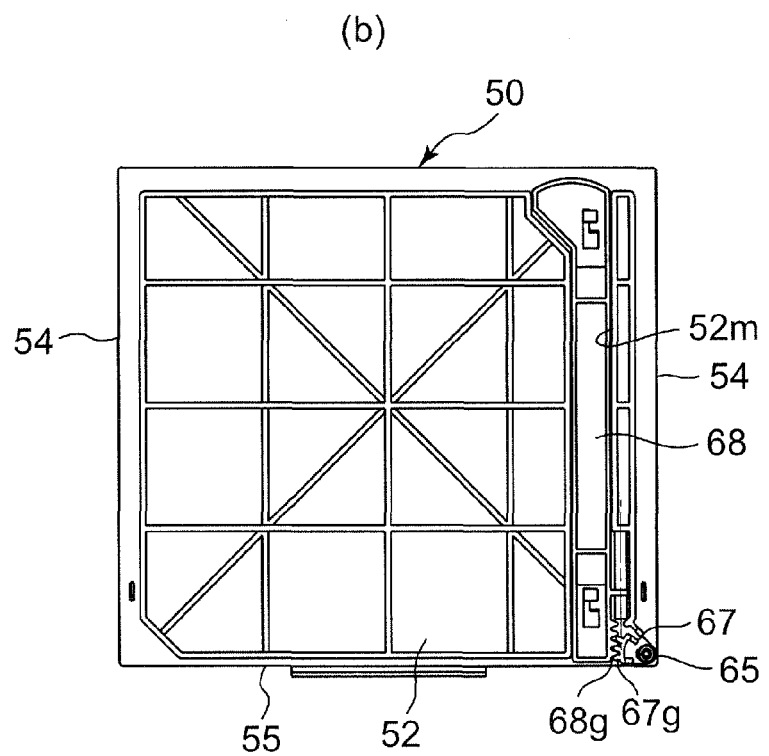

Fig.18D
(a)
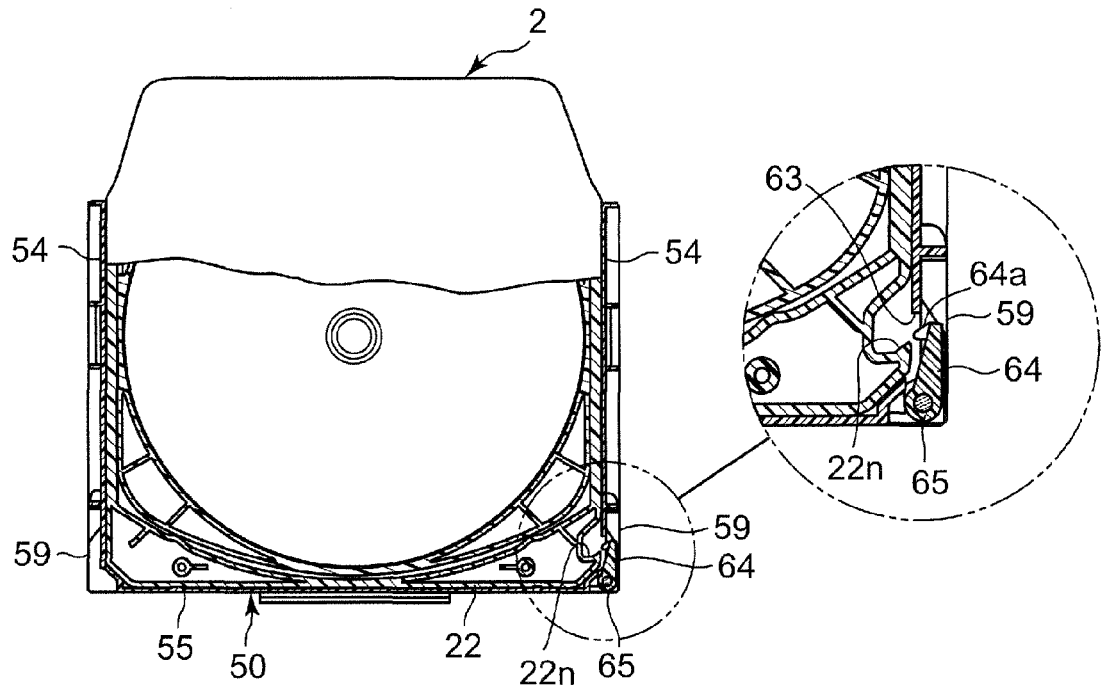
(b)
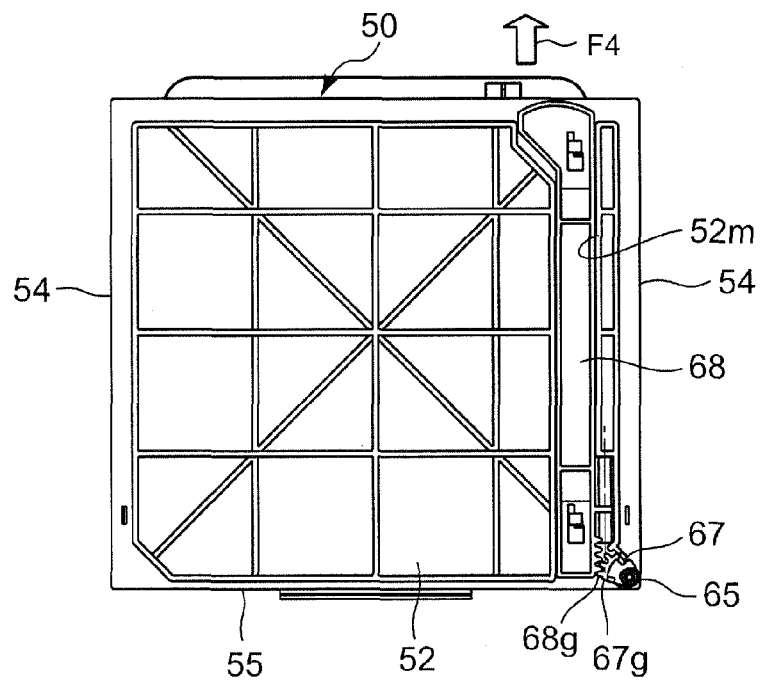

MAGAZINE BOX

BACKGROUND OF THE INVENTION

1. Field of the Invention

This disclosure relates to a magazine box for removably storing a plurality of disc-storing magazines. Further, this disclosure relates to a magazine box used, for example, in a disc apparatus for feeding a disc (disc-like information storage media such as CDs and DVDs) to each of a plurality of disc drives.

2. Description of the Related Art

As the disc apparatus for feeding the disc (disc-like information storage media such as CDs and DVDs) to each of the plurality of disc drives, for example, an apparatus described in JP 2011-204311 A (Patent Document 1) has been conventionally known. The disc apparatus in Patent Document 1 includes a cartridge (magazine) for storing a plurality of trays each storing one disc, and a plurality of disc drives. The disc apparatus in Patent Document 1 is configured to eject any tray from the magazine, suction and hold one disc stored in the ejected tray onto a suction pad, and place the disc on the tray of any disc drive.

Since the disc apparatus in Patent Document 1 is configured to store one disc in one tray, the number of discs stored in the magazine is small. In order to increase the number of the discs stored in the magazine, it is useful to directly stack the plurality of discs without interposing the tray therebetween to reduce the number of trays.

However, in this case, the adjacent discs are brought into intimate contact with each other, and thus cannot be easily separated from each other. JP 2000-117553 A (Patent Document 2) discloses a technique for solving this problem. Patent Document 2 discloses the technique of inserting a claw into the adjacent discs, thereby separating the two discs from each other to suction and hold the separated disc onto the suction pad.

PATENT DOCUMENTS

Patent Document 1: JP 2011-204311 A
Patent Document 2: JP 2000-117553 A

There is an increasing demand to further increase the number of stored discs in the disc apparatus. In order to increase the number of stored discs, it is effective to increase the number of magazines. Therefore, it is conceivable to provide a magazine box for removably storing a plurality of disc-storing magazines. A stocker for storing the plurality of magazine boxes side-by-side may be provided.

In such a disc apparatus, in the case where the magazine storing the disc is selectively detached from the magazine box and used, when the user manually handles the magazine, the disc can be damaged due to accidental falling. Accordingly, it is necessary to reliably prevent the user from manually handling the magazine. However, this must not obstruct a smooth ejecting operation by an automatic ejecting device in the disc apparatus.

In the case where the magazine box is detached from the stocker of the disc apparatus, is placed on, for example, a shelf in a depository of a data center, and is kept for a relatively long term, the plurality of discs stored in each of the magazines in the magazine box may be kept in a vertically stacked state. However, when the magazine box is kept in this state for a long term, the upper and lower discs are stacked in an airtight manner and fixed to each other due to self-weights of the stacked discs, impairing information recorded in the disc or the preservability of the discs themselves to interfere with the reproduction of the information.

SUMMARY OF THE INVENTION

To cope with the above problems, one non-limiting and exemplary embodiment of the present invention provides a magazine box capable of reliably preventing the user from manually ejecting the magazine without interfering the smooth ejecting motion during an automatic tray-ejection from the case in the disc apparatus is conducted. Further, another non-limiting and exemplary embodiment provides a magazine box capable of preventing damage of the information recorded in the discs and the preservability of the discs themselves even during long-term storage.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to one general aspect of the present disclosure, there is provided a magazine box for removably storing a plurality of disc-storing magazines used in a disc apparatus for feeding a disc to each of a plurality of disc drives; wherein the magazines each include a tray for storing the disc, a case for removably storing the tray, and a first locking mechanism for releasably locking the tray to the case; the first locking mechanism is configured to lock the tray to the case under a normal condition in which the tray is to be stored in the case, and release a locked state with an automatic tray-ejection from the case in the disc apparatus during the automatic tray-ejection from the case in the disc apparatus is conducted; the magazine box includes a second locking mechanism for releasably locking the case of each of the plurality of magazines to the magazine box, and the second locking mechanism maintains the locked state at least during the automatic tray-ejection from the case in the disc apparatus is conducted.

In this case, the magazine box may further include a box bottom surface for supporting the plurality of magazines in a vertically-stacked and stored state such that the discs in each of the magazines are substantially horizontally kept during usage; a box side surface for supporting the plurality of magazines arranged in a vertical orientation such that the discs in each of the magazines are substantially vertically kept during storage; and a locking mechanism for releasably locking the case of each of the magazines, the locking mechanism being disposed on the box bottom surface, and keeping the locked state at least during usage.

In the magazine box according to the present disclosure, by providing the first locking mechanism, it is possible to lock the tray to the case under the normal condition in which the tray is to be stored in the case, without interfering with the smooth ejecting motion during the automatic tray-ejection from the case in the disc apparatus is conducted, and to reliably prevent the user from manually ejecting the tray from the case. Further, by providing the second locking mechanism, the case of each magazine can be reliably locked to the magazine box at least during the automatic tray-ejection from the case in the disc apparatus is conducted, and to automatically eject only the tray.

Further, in the magazine box including the box bottom surface, the box side surface and the locking mechanism, by supporting the magazine box with the box side surface, it is possible to support the plurality of magazine arranged in the vertical orientation such that the discs in each magazine are substantially vertically kept during storage. Accordingly, it can be expected that an air layer is formed between the discs in each magazine. Thus, it is possible to prevent the upper and lower discs from being stacked in the airtight manner due to the self-weights of the stacked discs and being fixed to each other as conventional, and even during long-term storage, damage of information recorded in the discs and impairment of the preservability of the discs themselves can be suppressed. At this time, since the box bottom surface on which the locking mechanism is disposed is substantially vertically kept, the locking mechanism can be easily operated to ensure a good operability.

BRIEF DESCRIPTION OF THE DRAWINGS

FIG. 2D are bottom views partially showing the inside of the magazine in an unlocked state and a locked state of a magazine tray, which are achieved by using a locking mechanism (A);

FIG. 13 is a plan view showing a state where the picker in FIG. 3 transfers the magazine tray from the magazine to the vicinity of a plurality of disc drives;

FIG. 18A are a transverse cross-sectional view showing the magazine box for describing the operation of a locking mechanism (C), and a bottom view showing the state of the operating lever in the magazine box at this time;

FIG. 18D are a transverse cross-sectional view showing the magazine box in FIG. 18A in the released state of locking of the locking mechanism (C), and a bottom view showing the state of the operating lever in the magazine box at this time;

DETAILED DESCRIPTION OF THE INVENTION

Figure 1:
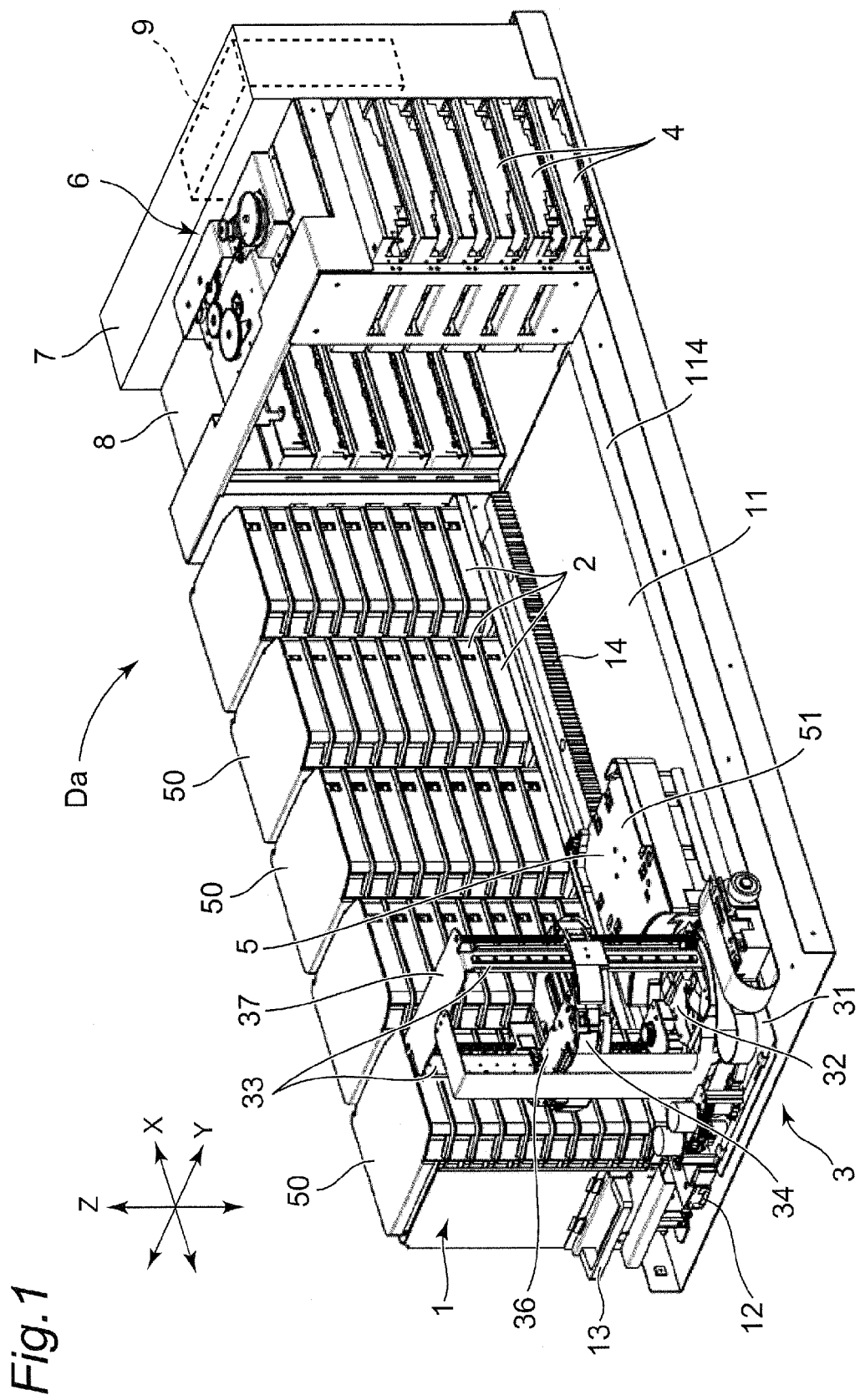
FIG. 1 is a perspective view showing a schematic configuration of a disc apparatus in accordance with Embodiment 1 in this disclosure.

A magazine box in this disclosure can take following modes on the basis of the above-mentioned configurations.

That is, the second locking mechanism may include a plurality of locking members engageable with the respective cases of the plurality of magazines stored in the magazine box, and the magazine box may include an operating member configured to simultaneously operate the plurality of locking members in a locking release direction.

With such a configuration, in the case where the plurality of magazine are stored in the magazine box, the locked state of the cases of all magazines to the magazine box by use of the second locking mechanism can be simultaneously released, which improves convenience.

In this case, at least while the automatic tray-ejection from the case in the disc apparatus is conducted, the magazine box may be mounted with the box bottom surface being on the lower side in the state where the plurality of magazine are vertically stacked and stored, and the operating member of the second locking mechanism may be disposed on the box bottom surface.

With such a configuration, since at least during the automatic tray-ejection from the case in the disc apparatus is conducted, the operating member of the second locking mechanism is located on the box bottom surface, it can be reliably prevented that the operating member is operated during the automatic tray-ejection from the case in the disc apparatus is conducted.

In the above-mentioned cases, the magazine may include a third locking mechanism for unremovably locking the tray to the case in the state where the magazine is not stored in the magazine box, and releasing the locked state of the tray to the case when the magazine is normally stored in the magazine box.

With such a configuration, in the case where no magazine is stored in the magazine box, the tray can be locked to the case more reliably, thereby preventing the user from manually ejecting the tray from the case.

In this case, the magazine box may include a biasing member configured to bias a locking member of the third locking mechanism in the locking release direction when the magazine is normally stored in the magazine box.

Due to the existence of the biasing member, merely by normally storing the magazine in the magazine box, the locked state of the tray to the case by use of the third locking mechanism can be easily released with the relatively simple configuration.

Further, in this case, the biasing member may simultaneously bias the locking members of the third locking mechanisms of the plurality of magazines stored in the magazine box in the locking release direction.

With such a configuration, in the case where the plurality of magazines are stored in the magazine box, the locked state of the tray to the case by use of the third locking mechanism can be simultaneously released in all of the magazines, which improves convenience.

In the above-mentioned cases, the disc apparatus may include a positioning member for positioning the magazine box at a predetermined position of the disc apparatus, and the magazine box may include a fourth locking mechanism for unremovably locking the tray to the case in the state where the magazine box is not positioned at the predetermined position, and releasing the locked state of the tray to the case when the magazine box is positioned at the predetermined position.

With such a configuration, in the case where the magazine box is not located at the predetermined position of the disc apparatus, the tray can be locked to the case more reliably, thereby preventing the user from manually ejecting the tray from the case.

Further, in the above-mentioned cases, the tray may include a shaft to be inserted into a central hole of each of the plurality of stored discs.

With such a configuration, the discs can be prevented from being stacked in an irregularly dispersed manner, and movement of the discs in a planar direction is restricted to prevent damage of the discs. Especially in the other magazine box in this disclosure, during storage, even in the case where the magazine box is supported such that the plurality of discs in each magazine are substantially vertically kept, the discs can be prevented from being arranged in an irregularly dispersed manner, and movement of the discs in a planar direction is restricted to prevent damage of the discs.

Embodiments will be described below in detail with reference to the drawings. However, detailed description more than necessary may be omitted. For example, detailed description of well-known matters and redundant description of the substantially same configuration may be omitted. This is made to avoid unnecessary redundant description and promote understanding of those skilled in the art.

The inventor (s) provides appended drawings and following description to allow those skilled in the art to sufficiently understand this disclosure, and does not intend to limit the subject matter of Claims.

Embodiment 1

In the following, with reference to the drawings 1-18, a description will be given of an embodiment (Embodiment 1) of the present disclosure. It is to be noted that, identical reference characters are allotted to identical or corresponding parts throughout the drawings referred to in the following, and description thereof will not be repeated.

FIG. 1 is a perspective view showing the schematic structure of a disc apparatus including a magazine box according to the embodiment of the present disclosure. It is to be noted that, in the present embodiment, the left side in FIG. 1 is referred to as the "apparatus-front side", and the right side in FIG. 1 is referred to as the "apparatus-rear side".

Firstly, with reference to FIG. 1, a description will be given of an overall structure of the disc apparatus according to the present embodiment.

The disc apparatus according to the present embodiment includes two magazine stockers 1, 1. The two magazine stockers 1, 1 are provided on a bottom chassis 11 so as to oppose to each other in a device width direction Y. It is to be noted that, in FIG. 1, one of the magazine stockers 1 (on the near side) is not shown.

The magazine stocker 1 includes a plurality of (five, for example, in this embodiment) magazine boxes 50 for removably storing a plurality of disc-storing magazines 2. The five magazine boxes 50 are aligned, in the apparatus depth direction X, on the bottom chassis 11 of the disc apparatus Da (refer to, for example, FIG. 1). Each magazine box 50 can store the plurality of (nine, for example, in this embodiment) magazines 2, which are vertically arranged in the substantially horizontal position, in the magazine stocker 1.

Each magazine stocker 1 stores a plurality of magazines 2. Each magazine 2 includes magazine trays 21 (refer to FIGS. 2A-2E) storing a plurality of (e.g., 12 pieces of) discs. Between the two magazine stockers 1, 1, a picker 3 that draws out the magazine tray 21 from one magazine 2 selected from a plurality of magazines 2 and that holds the magazine tray 21 is provided.

The picker 3 is structured to convey the held magazine tray 21 to a position near a plurality of disc drives 4 arranged at the device-rear side. The picker 3 is integrally provided with a lifter 5 that pushes out a plurality of discs from the magazine tray 21.

The disc drives 4 are each an apparatus that performs recording or reproducing of information on or from a disc. Further, the disc drives 4 are each a tray-scheme disc drive that load discs using trays. The plurality of disc drives 4 are stacked in a device height direction Z, and arranged so as to be adjacent to the magazine stockers 1, 1 on the device-rear side. Between the plurality of disc drives 4 arranged as being stacked so as to be adjacent to one magazine stocker 1 and the plurality of disc drives 4 arranged as being stacked so as to be adjacent to the other magazine stocker 1, a carrier 6 is provided.

The carrier 6 is structured to: retain a plurality of discs pushed out by the lifter 5 in such a stacked state; separate one disc from the retained plurality of discs above a tray 21 (refer to FIGS. 2A-2E) ejected from an arbitrary disc drive 4; and place the separated disc on the tray 21.

Further toward the rear side than the carrier 6 and the disc drive 4, a control unit 7 is arranged, which includes electric circuits, power source and the like. The control unit 7 is further provided with a controller 9. The operation of each constituent component of the disc apparatus Da such as picker 3, disc drive 4, carrier 6 (the operation of motor etc.) is controlled by the controller 9. The controller 9 is connected, for example, to a host computer which manages the data. Based on instructions from operator, the host computer sends commands to the controller 9 so as to perform operations such as data reading from or writing on the specified magazine 2. Based on the commands, the controller 9 controls the operation of each constituent component of the disc apparatus Da such as picker 3, disc drive 4, carrier 6 and the like.

Next, a description will be given of the structure of the aforementioned devices and components in more detail.

The magazine stockers 1 are provided along guide rails 12 that slidably guide the picker 3. The guide rails 12 are provided so as to extend in an apparatus depth direction X (in the longitudinal direction of the magazine stockers 1). A grip 13 is provided at the side face on the device-front side of each magazine stocker 1. The magazine stocker 1 can be shifted toward the device-front side by the grip 13 being pulled. Each magazine stocker 1 is provided with a partition plate (not shown) extended in the device width direction Y. In each of the space surrounded by the partition plates, the magazine box 50 is stored. The structure etc. of the magazine box 50 and the magazine stocker 1 are explained further detail later.

Figure 2A:
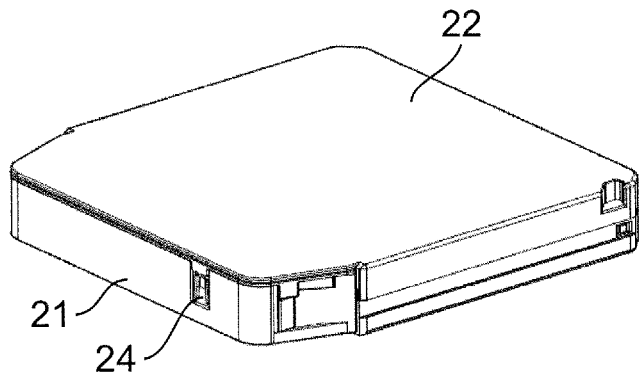
FIG. 2A is a perspective view showing a magazine of the disc apparatus in FIG. 1.
Figure 2B:
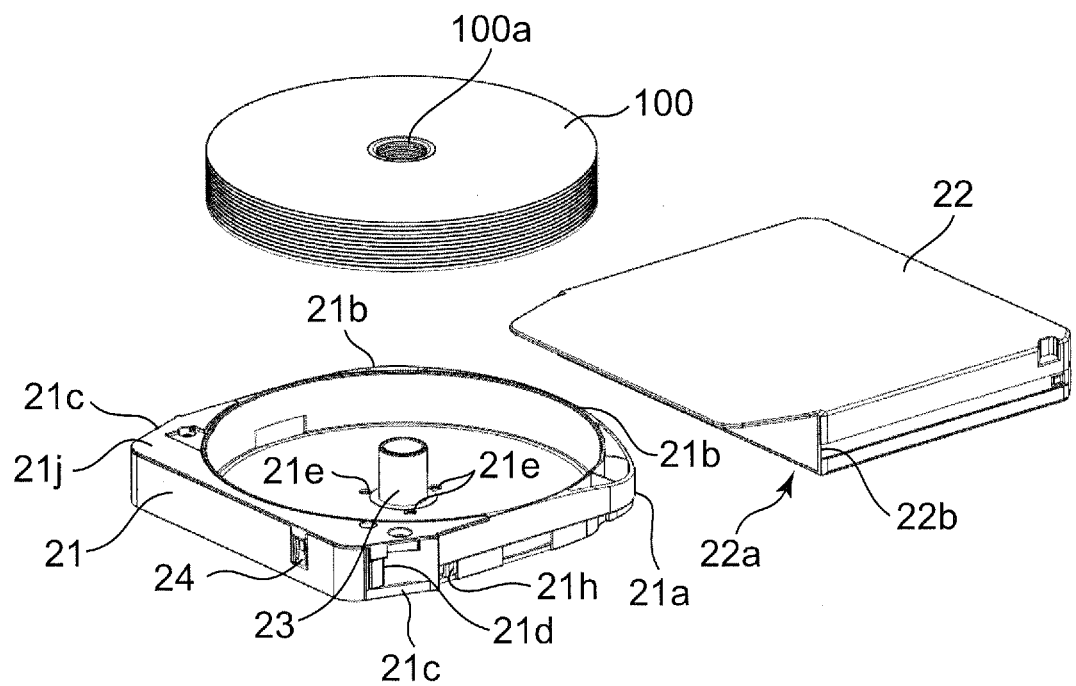
FIG. 2B is an exploded perspective view showing the magazine in FIG. 2A.

As shown in FIG. 2A, the magazine 2 includes the magazine tray 21, and a case 22 that has a substantially rectangular parallelepiped shape and that stores the magazine tray 21. As shown in FIG. 2B, at the front face (one side face) of the case 22, an opening 22a into which the magazine tray 21 can be inserted and taken out is provided.

The magazine tray 21 is formed to have an outer shape being substantially rectangular in planar view. The magazine tray 21 stores a plurality of discs 100 as being stacked in close contact with one another. At the opposing corner portions that position on the back side of the magazine case 22 in a state where the magazine tray 21 is stored in the case 22, cut portions 21a, 21a are formed. Further, a side face 21b that positions on the back side of the magazine case 22 in the state where the magazine tray 21 is stored in the magazine case 22 is formed to be arc-like as a whole including the cut portions 21a, 21a.

At the opposing corner portions that position on the front face side of the case 22 in the state where the magazine tray 21 is stored in the case 22, cutout portions 21c, 21c are formed. On the inner side of the cutout portions 21c, 21c in the width direction of the magazine tray 21, engaging recess portions 21d, 21d with which a pair of hooks 35, 35, whose description will follow, engage are formed.

The magazine tray 21 is provided with a core rod 23, which is inserted into a center hole 100a provided at each of the plurality of discs 100 to restrict shifting of the discs 100 in the direction of disc surface.

At least one or more core holes 21e, into which an elevating pin (not shown) of a lifter 5 is inserted, are provided in the vicinity of the core rod 23. In this embodiment, the three holes 21e are spaced every 120 degrees. The three holes 21e are located so as to be opposed to non-recording and non-reproducing areas of inner circumferential parts of the discs 100 when the core rod 23 is inserted into the center hole 100a of the discs 100.

Figure 2C:
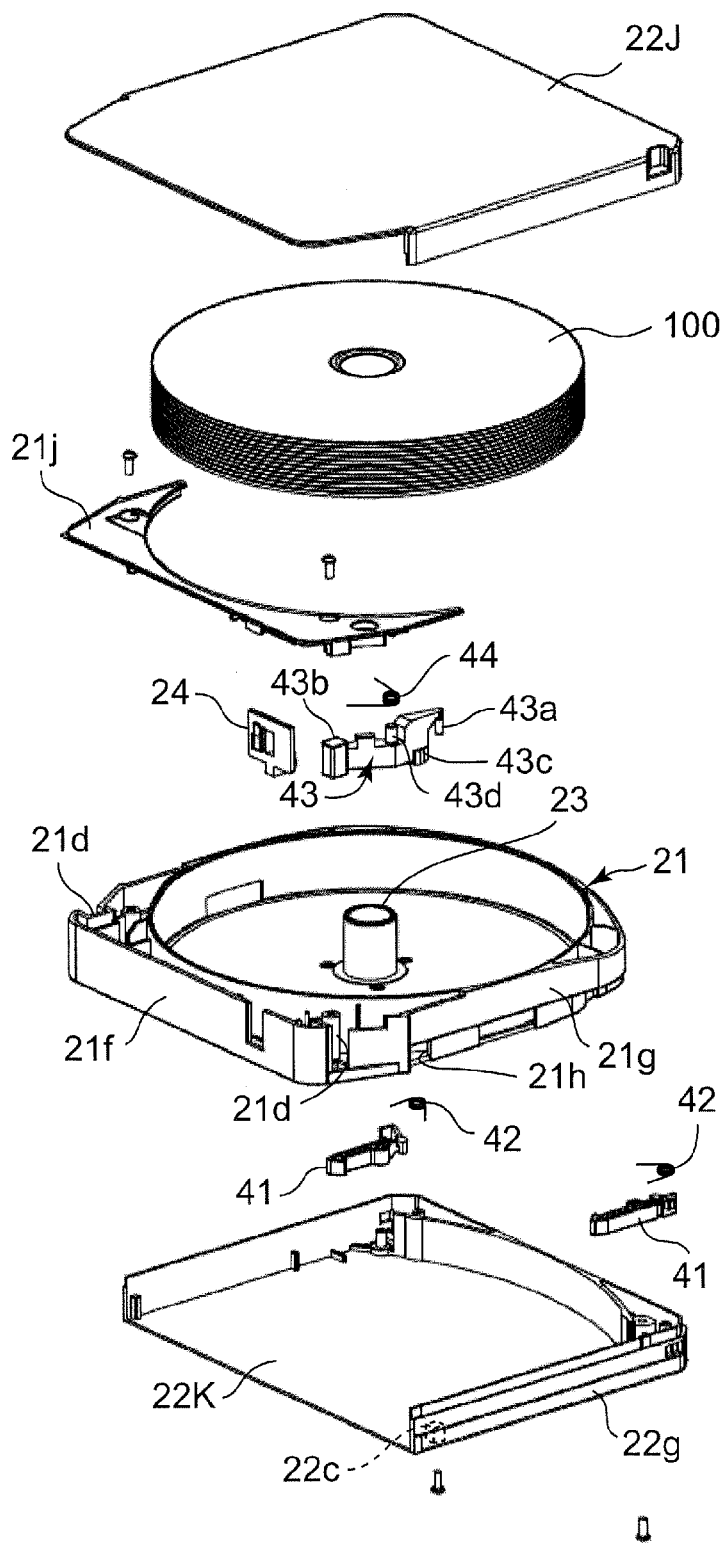
FIG. 2C is an exploded perspective view showing the magazine in FIG. 2B in more detail.

FIG. 2C is an exploded perspective view showing the magazine 2 in FIG. 2B in more detail. As shown in this figure, the case 22 is divided into an upper case body 22J and a lower case body 22K, and a pair of locking levers 41 (hereinafter referred to as locking levers (A)) for locking/unlocking the magazine tray 21 with respect to the case 22 and biasing springs 42, 42 (hereinafter referred to as biasing springs (A)) for biasing the locking levers (A) 41, 41, respectively, are integrated with a pair of corners of the lower case body 22K, and then, the upper case body 22J and the lower case body 22K are assembled together and fixed to each other in the vertical direction in FIG. 2C.

All of the locking levers (A) 41, 41 and the biasing springs (A) 42, 42 are attached to the corners of the case 22, which are located on its back surface side when the magazine tray 21 is stored in the case 22, and as described later, unremovably lock the magazine tray 21 to the case 22 in the state where the magazine 2 is not stored in the magazine box 50, and release the locked state of the magazine tray 21 to the case 22 when the magazine 2 is normally stored in the magazine box 50.

Each of the locking levers (A) 41 is provided with the biasing spring (A) 42 configured to bias the locking lever (A) 41 in a locking direction. In this embodiment, the biasing springs (A) 42 each are formed of, for example, a helical spring. The locking levers (A) 41, 41, the biasing springs (A) 42, 42, and below-mentioned resin springs 62, 62 constitute a main part of a locking mechanism (hereinafter referred to as locking mechanism (A)). The locking mechanism (A) corresponds to a "third locking mechanism" in this disclosure.

FIG. 2D are bottom views partially showing the inside of the magazine 2 in an unlocked state (a) and a locked state (b) of the magazine tray 21, which are achieved by means of the locking mechanism (A). As apparent from especially FIG. 2D (a), the locking levers (A) 41 each have a locking claw 41a at its one end (upper side in FIG. 2D) and a receiving part 41b for receiving a release force from the outside at lock release at its other end (lower side in FIG. 2D), and an intermediate portion between the parts 41a and 41b is rotatably supported about a pivot pin 22p provided on an arched vertical wall 22f vertically formed in the vicinity of a back surface of the lower case body 22K.

The biasing springs (A) 42 each are attached to a spring fulcrum 22b protrudingly provided on the lower case body 22K, and bias a back surface of the receiving part 41b of the locking lever (A) 41. The biasing springs (A) 42 each bias the corresponding locking lever (A) 41 in the locking direction (counterclockwise direction in the right locking lever (A) 41 in FIG. 2D) and thus the locking lever (A) 41 is kept at a locked position substantially parallel to a side wall 22g of the lower case body 22K. In this state, the other end (lower side in FIG. 2D) of the locking lever (A) 41 comes into contact with the side wall 22g.

When the magazine tray 21 in the unlocked state (before loading of the magazine tray 21 to the case 22) in FIG. 2D (a) is inserted into and loaded to the case 22, the magazine tray 21 is inserted while inclined curved parts 21m provided in the vicinity of claw engaged parts 21n of the magazine tray 21 presses the locking claws 41a of the locking levers (A) 41 toward the outside. Thereby, the locking levers (A) 41 rotate against the biasing force of the biasing springs (A) 42, and the locking claws 41a are engaged with the claw engaged parts 21n while being guided on surfaces of the curved parts 21m. As a result, as shown in FIG. 2D (b), the magazine tray 21 is stored in the case 22 and locked.

As shown in FIG. 2C, a write protector 24 is attached to a front wall 21f located on the side of the front surface of the case 22 when the magazine tray 21 is stored in the case 22.

The write protector 24 is publicly known, and displays whether writing in the internal discs 100 is enabled or disabled through a window opened/closed state. The picker 3 for drawing the magazine tray 21 from the case 22 may be provided with a sensor (not shown) for detecting the window opened/closed state of the write protector 24 to detect whether writing in the internal discs 100 is enabled or disabled for the magazine tray 21. The magazine tray 21 includes a front cover 21*j* covering above a portion located on the side of the front surface of the case 22 when the magazine tray 21 is stored in the case 22.

The magazine tray 21 further includes another locking mechanism (hereinafter referred to as locking mechanism (B)) having another locking lever 43 (hereinafter referred to as locking lever (B)) and a biasing spring 44 for biasing the lever (hereinafter referred to as biasing spring (B)) as main parts. As described later, the locking mechanism (B) locks the magazine tray 21 to the case 22 under a "normal condition" in which the stored state of the magazine tray 21 in the case 22 is kept, and releases the locked state by means of lock releasing means (below-mentioned pair of hooks 35: refer to FIGS. 3, 5, 8 and 9) of the picker 3 when the magazine tray 21 is ejected from the case 22 by use of the automatic tray-ejecting device (that is, picker 3) of the disc apparatus Da in the state where the magazine 2 is stored in the magazine box 50. The "normal condition" refers to the case where "the stored state of the magazine tray 21 in the case 22 is kept" irrespective of whether or not the magazine 2 is stored in the magazine box 50.

The locking lever (B) 43 has a rotating fulcrum 43*a* that is a fulcrum of rotation at its one end. Further, the locking lever (B) 43 has, at its other end, an engaging end 43*b* moving in the engaging direction of the hooks 35 of the picker 3 against the biasing force of the biasing spring (B) 44 when the hooks 35 engage with engaging recess portions 21*d* of the magazine tray 21. Furthermore, the locking lever (B) 43 has a protruding part 43*c* that is located between the both ends 43*a*, 43*b* and protrudes outward by a predetermined amount, and a spring fulcrum 43*d* to which the biasing spring (B) 44 is attached.

In the state where the magazine tray 21 is normally stored in the case 22, the protruding part 43*c* is located at a position corresponding to an opening 21*h* formed on a side wall 21*g* of the magazine tray 21, protrudes from the opening 21*h* by a small amount, and engages with an engaging part 22*c* on the inner surface of the side wall 22*g* of the lower case body 22K of the case 22.

Figure 2E:
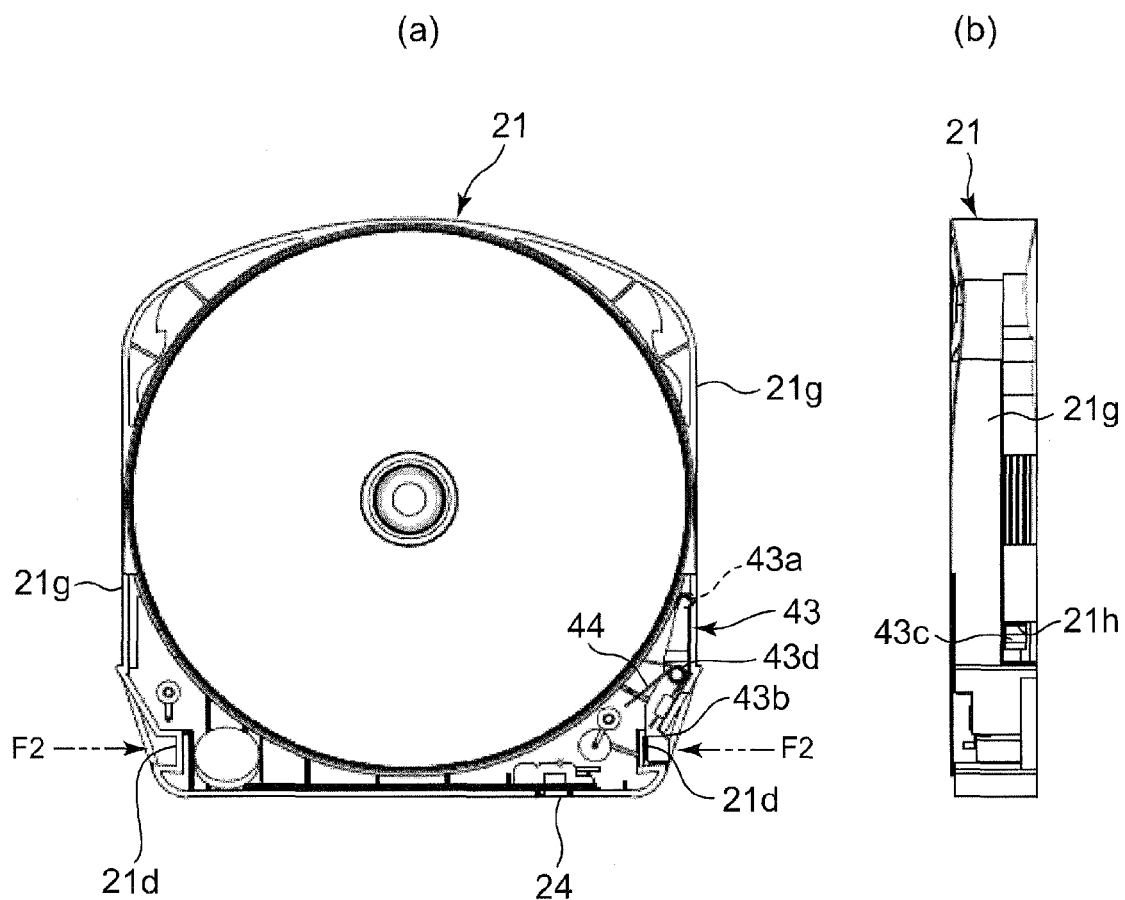
FIG. 2E are a plan view and a side view showing the inside of the magazine tray to which a locking mechanism (B) is attached.

FIG. 2E are a plan view (a) and a side view (b) that show the inside of the magazine tray 21 to which the locking mechanism (B) is loaded. In the state where the locking mechanism (B) is attached to the magazine tray 21, the locking lever (B) 43 is pressed onto the inner surface of the side wall 21*g* by the biasing force of the biasing spring (B) 44, and the protruding part 43*c* is fitted into the opening 21*h* of the side wall 21*g*.

In this state, when the hooks 35 of the picker 3 engage with the engaging recess portions 21*d* of the magazine tray 21, an engaging force presented by a dashed arrow F2 in FIG. 2E (a) is exerted to the engaging recess portions 21*d* and accordingly, the engaging end 43*b* of the locking lever (B) 43 moves in the direction of the dashed arrow F2 (the engaging direction of the hooks 35) against the biasing force of the biasing spring (B) 44. Accordingly, the locking lever (B) 43 rotates about the rotating fulcrum 43*a* in the clockwise direction in this figure (that is, the direction of separating from the inner surface of the side wall 21*g*). As a result, the protruding part 43*c* is escaped from the opening 21*h* of the side wall 21*g*, thereby releasing the engagement between the protruding part 43*c* and the inner surface of the side wall 22*g* of the case 22 to release the locked state by the locking mechanism (B).

The engaging recess portions 21*d* of the magazine tray 21 have such size and shape as to be easily and reliably engaged with the hooks 35 of the picker 3 and not to be engaged with a human's finger. For example, the thickness of the hooks 35 can be reduced by making the lock releasing means (that is, the hooks 35) of the picker 3 from a material having a high strength and rigidity, such as titanium. Accordingly, in this case, the engaging recess portions 21*d* of the magazine tray 21 can be narrowed, preventing engagement with a person's finger more reliably.

Consequently, the locking mechanism (B) reliably locks the magazine tray 21 to the case 22 under the "normal condition" such that a person cannot eject the magazine tray 21, and when the automatic tray-ejecting device (that is, the picker 3) of the disc apparatus Da ejects the magazine tray 21 from the case 21, the lock releasing means (that is, the hooks 35) of the picker 3 releases the locked state. The locking mechanism (B) corresponds to the "first locking mechanism" in this disclosure.

Since the magazine 2 includes the locking mechanism (B), (irrespective of whether or not the magazine 2 is stored in the magazine box 50), under the "normal condition" in which the stored state of the magazine tray 21 in the case 22 should be kept, the magazine tray 21 is reliably locked to the case 22 so as not to be ejected by any person. Therefore, the locking mechanism (A) is not indispensable, and operates as a double security locking means for locking the magazine tray 21 to the case 22 more reliably in the case where the magazine 2 is not stored in the magazine box 50, and preventing user's manual ejection of the magazine tray 21 from the case 22.

Figure 3:
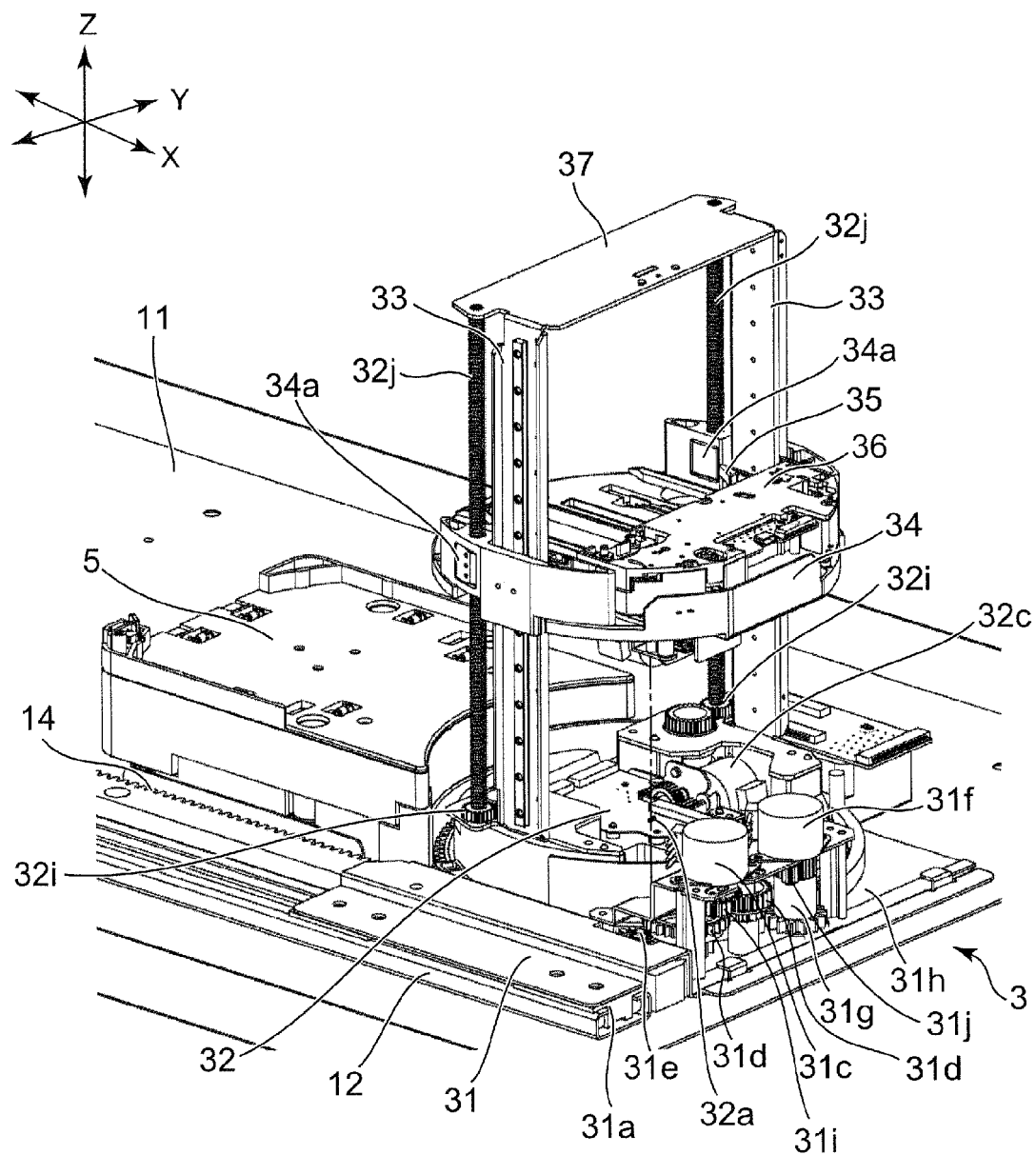
FIG. 3 is a perspective view of a picker of the disc apparatus in FIG. 1.
Figure 4:
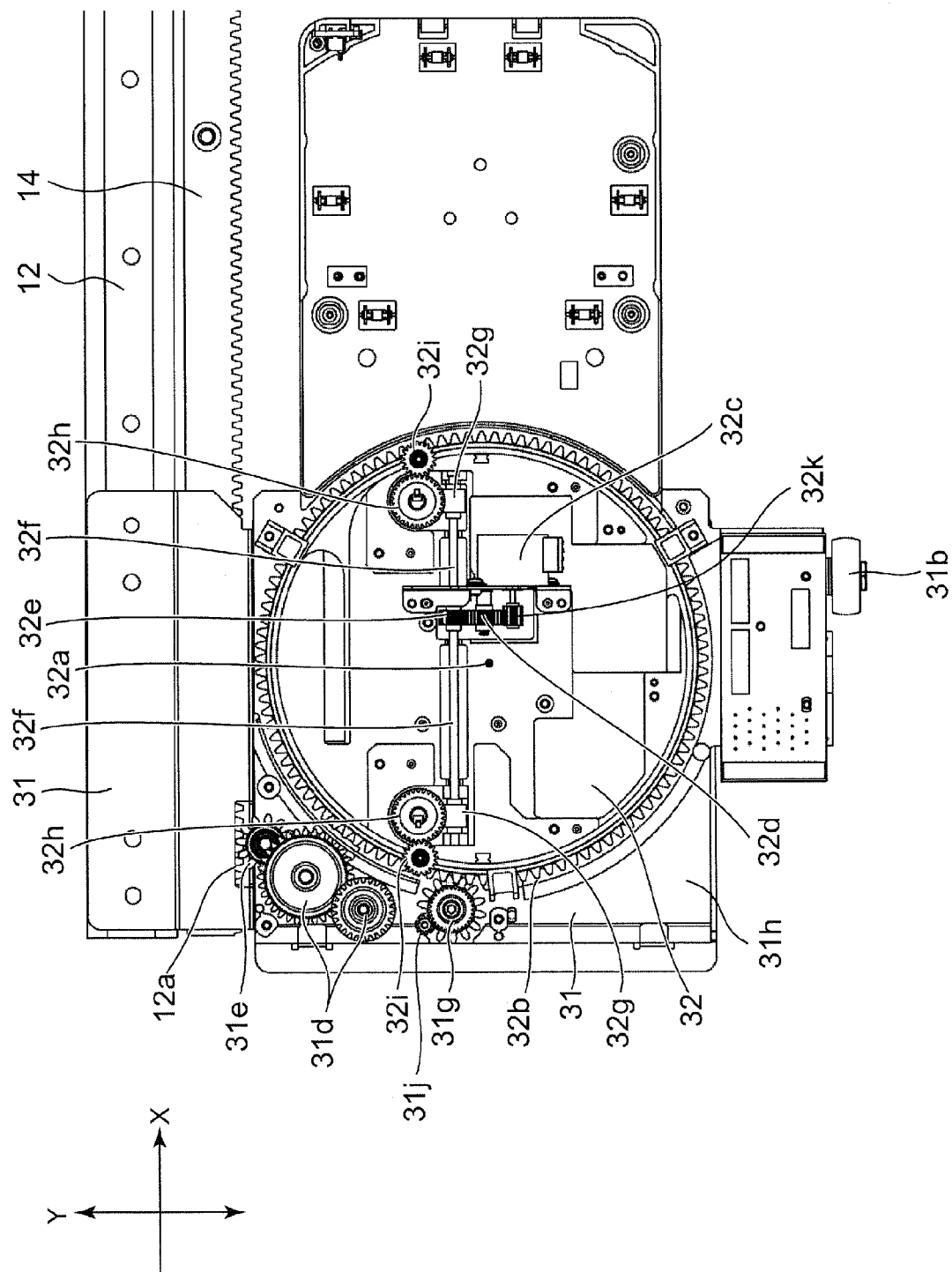
FIG. 4 is a plan view showing a configuration of a driving system for a platform of the picker in FIG. 3.

The picker 3 includes a run base 31. As shown in FIG. 3, a movable platform 31*a* slidably shifting along the guide rail 12 is attached on one magazine stocker 1 side of the run base 31. Further, as shown in FIG. 4, a roller 31*b* is attached on other magazine stocker 1 side of the run base 31.

As shown in FIG. 3, the run base 31 is provided with a picker motor 31*c* that produces drive force for causing the picker 3 to shift in the depth direction X of the disc apparatus Da (apparatus depth direction). A reduction gear 31*d* meshes with a motor gear 31*i*, into which the drive shaft of the picker motor 31*c* is press fitted. The reduction gear 31*d* meshes with a pinion gear 31*e*. The pinion gear 31*e* meshes with a rack 14 provided adjacent to the guide rail 12 to extend in the apparatus depth direction X.

When the picker motor 31*c* is driven, the drive force of the picker motor 31*c* is transferred to the pinion gear 31*e* via the motor gear 31*i* and the reduction gear 31*d*, to rotate the pinion gear 31*e*. Here, the rack 14 is fixed to the bottom chassis 11. On the other hand, the run base 31 is not fixed to the bottom chassis 11. Accordingly, when the pinion gear 31*e* rotates, the pinion gear 31*e* shifts along the rack 14, whereby the picker 3 shifts in the device depth direction X.

As the picker motor 31*c*, for example, a stepping motor is employed. Applying a prescribed pulse to the picker motor 31*c*, the picker 3 can be shifted to be located at the front of a prescribed magazine 2.

A picker base 31*h* made of resin is attached to the run base 31 made of a sheet metal. The picker base 31*h* is provided with a rotary table 32 so as to be rotatable substantially about a rotation axis 32*a* extending in the device height direction Z. Further, the picker base 31*h* is provided with a rotary table motor 31*f* that produces the drive force for causing the rotary table 32 to rotate. As shown in FIG. 4, a reduction gear 31*g* meshes with the motor gear 31*j*, into which the drive shaft of the rotary table motor 31*f* is press fitted. The reduction gear 31g meshes with a rotary table gear 32b provided at the outer circumferential portion of the rotary table 32. When the rotary table motor 31f is driven, the drive force of the rotary table motor 31f is transferred to the rotary table gear 32b via the motor gear 31j and the reduction gear 31g, whereby the rotary table 32 rotates.

The rotary table 32 is provided with a pair of up-and-down rails 33, 33 extending along the device height direction Z and opposing to each other. Between the pair of up-and-down rails 33, 33, an up-and-down table 34 is provided. Further, the rotary table 32 is provided with an up-and-down table motor 32c that produces the drive force for causing the up-and-down table 34 to rise and lower.

As shown in FIG. 4, a relay gear 32d meshes with a motor gear 32k, into which the drive shaft of the up-and-down table motor 32c is press fitted. The relay gear 32d meshes with a coupling shaft gear 32e. A coupling shaft 32f penetrates through the center portion of the coupling shaft gear 32e. Worms 32g, 32g are fixed to the opposite ends of the coupling shaft 32f. The worms 32g mesh with relay gears 32h. The relay gears 32h mesh with lead screw gears 32i. The lead screw gears 32i are fixed to lead screws 32j. The lead screws 32j are provided so as to extend in the apparatus height direction Z along the up-and-down rails 33. As shown in FIG. 3, nuts 34a provided to the up-and-down table 34 are screwed with the lead screws 32j.

When the up-and-down table motor 32c is driven, the drive force of the up-and-down table motor 32c is transferred to the lead screws 32j via the motor gear 32k, the relay gear 32d, the coupling shaft gear 32e, the coupling shaft 32f, the worms 32g, the relay gears 32h, and the lead screw gears 32i, whereby the lead screws 32j rotate. Thus, the up-and-down table 34 rises and lowers in the apparatus height direction Z along the pair of up-and-down rails 33 and 33.

Figure 8:
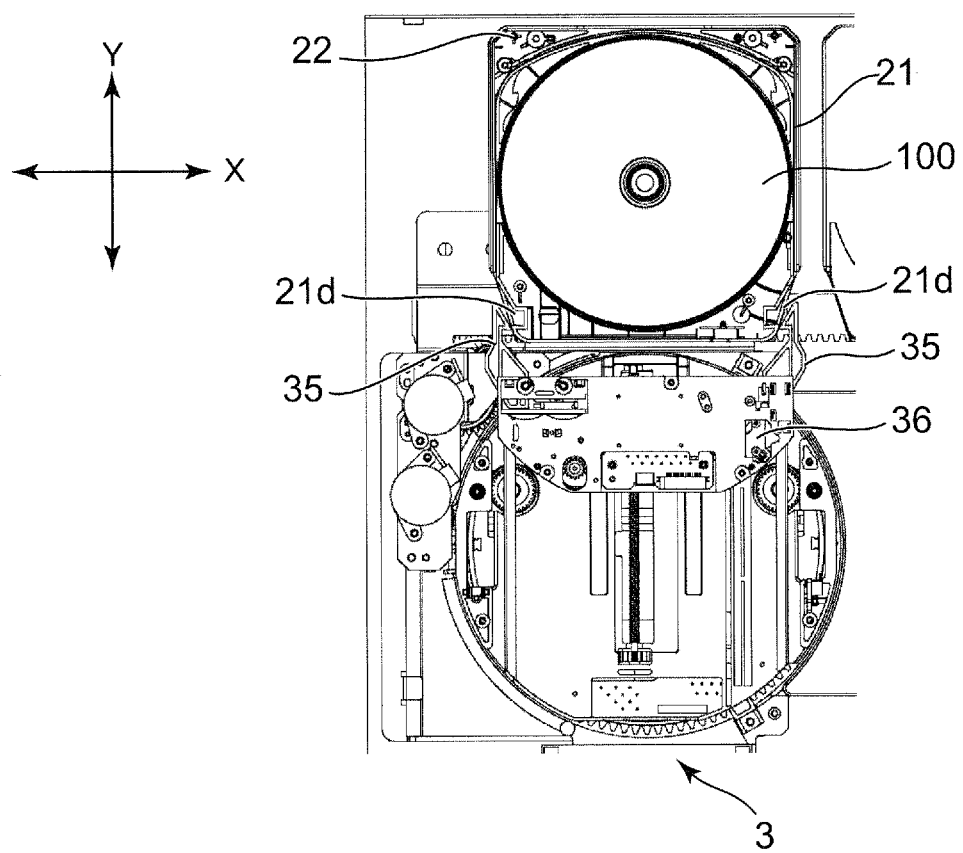
FIG. 8 is a plan view showing a state where the picker in FIG. 3 ejects the magazine tray from the magazine.

As shown in FIG. 8, the up-and-down table 34 is provided with a pair of hooks 35, 35 that can engage with engaging recess portions 21d of the magazine tray 21, and a chuck 36 functioning to open and close the pair of hooks 35, 35 and to cause the pair of hooks 35, 35 to shift forward and backward.

Figure 5:
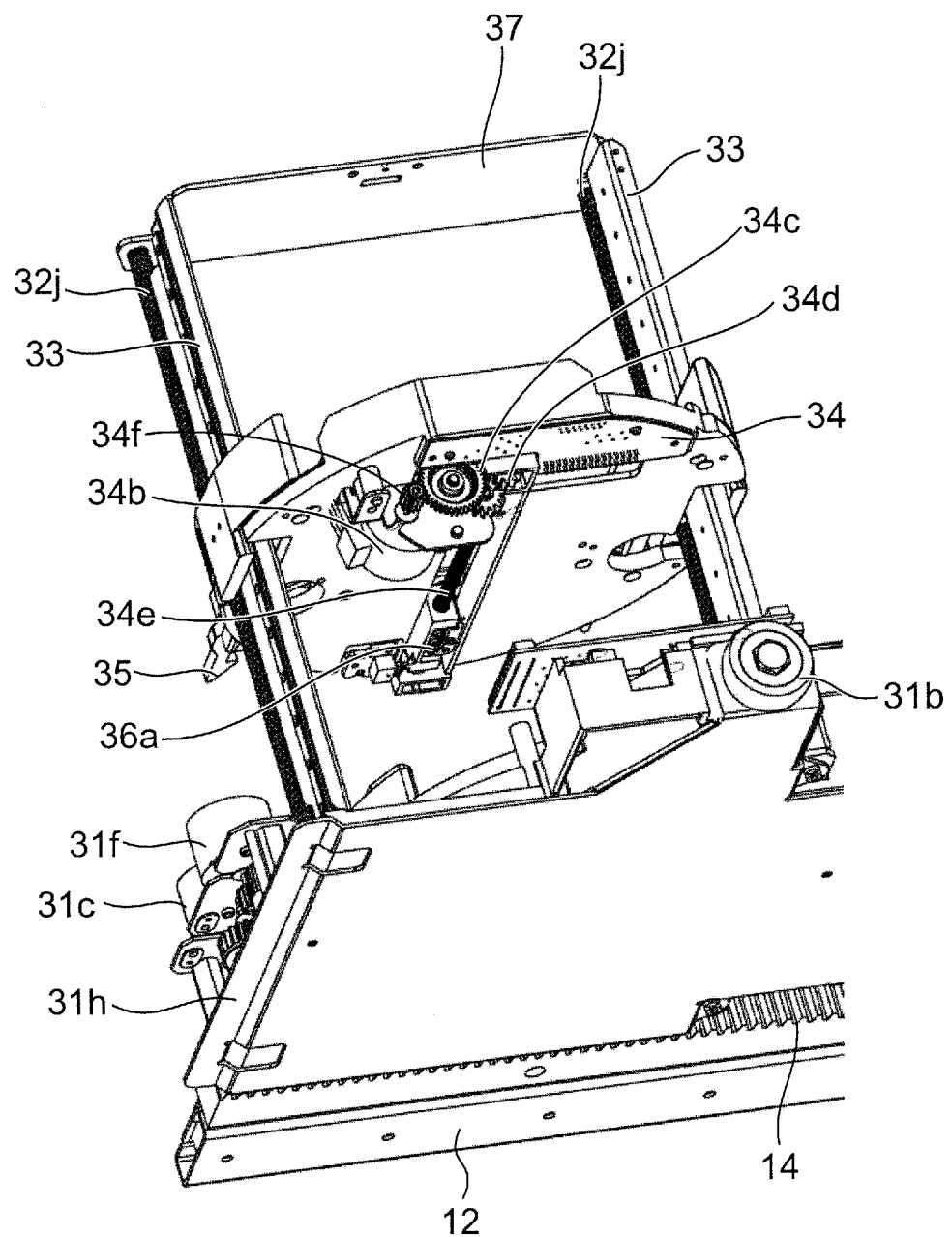
FIG. 5 is a perspective view showing the picker in FIG. 3 when viewed in an obliquely upward direction.

Further, as shown in FIG. 5, the up-and-down table 34 is provided with a chuck motor 34b. A reduction gear 34c meshes with a motor gear 34f, into which the drive shaft of the chuck motor 34b is press fitted. The reduction gear 34c meshes with a lead screw gear 34d. The lead screw gear 34d is fixed to a lead screw 34e. The lead screw 34e is provided to extend in the direction perpendicular to the line connecting between the pair of up-and-down rails 33 and 33. A nut 36a fixed to the chuck 36 is screwed with the lead screw 34e.

When the chuck motor 34b is driven, the drive force of the chuck motor 34b is transferred to the nut 36a via the motor gear 34f, the reduction gear 34c, the lead screw gear 34d, and the lead screw 34e, whereby the chuck 36 shifts along the lead screw 34e.

Further, the chuck 36 is structured to be capable of adjusting the interval of the pair of hooks 35, 35. By the chuck 36 reducing the interval between the pair of hooks 35, 35, the pair of hooks 35, 35 can engage with the engaging recess portions 21d, 21d of the magazine tray 21. On the other hand, by the chuck 36 increasing the interval of the pair of hooks 35, 35, the engaged state between the pair of hooks 35, 35 and the engaging recess portions 21d, 21d of the magazine tray 21 can be released.

The paired up-and-down rails 33 are attached to opposite side faces of a U-shaped angle plate 37, respectively. The top end portions of the paired lead screws 32j are rotatably attached to the top face of the angle plate 37.

The picker motor 31c, the rotary table motor 31f, the up-and-down table motor 32c, and the chuck motor 34b are connected to the controller 9 in the control unit 7 via an FFC (flexible flat cable) 114 (see FIG. 1), and drive under control of the controller 9.

Figure 6:
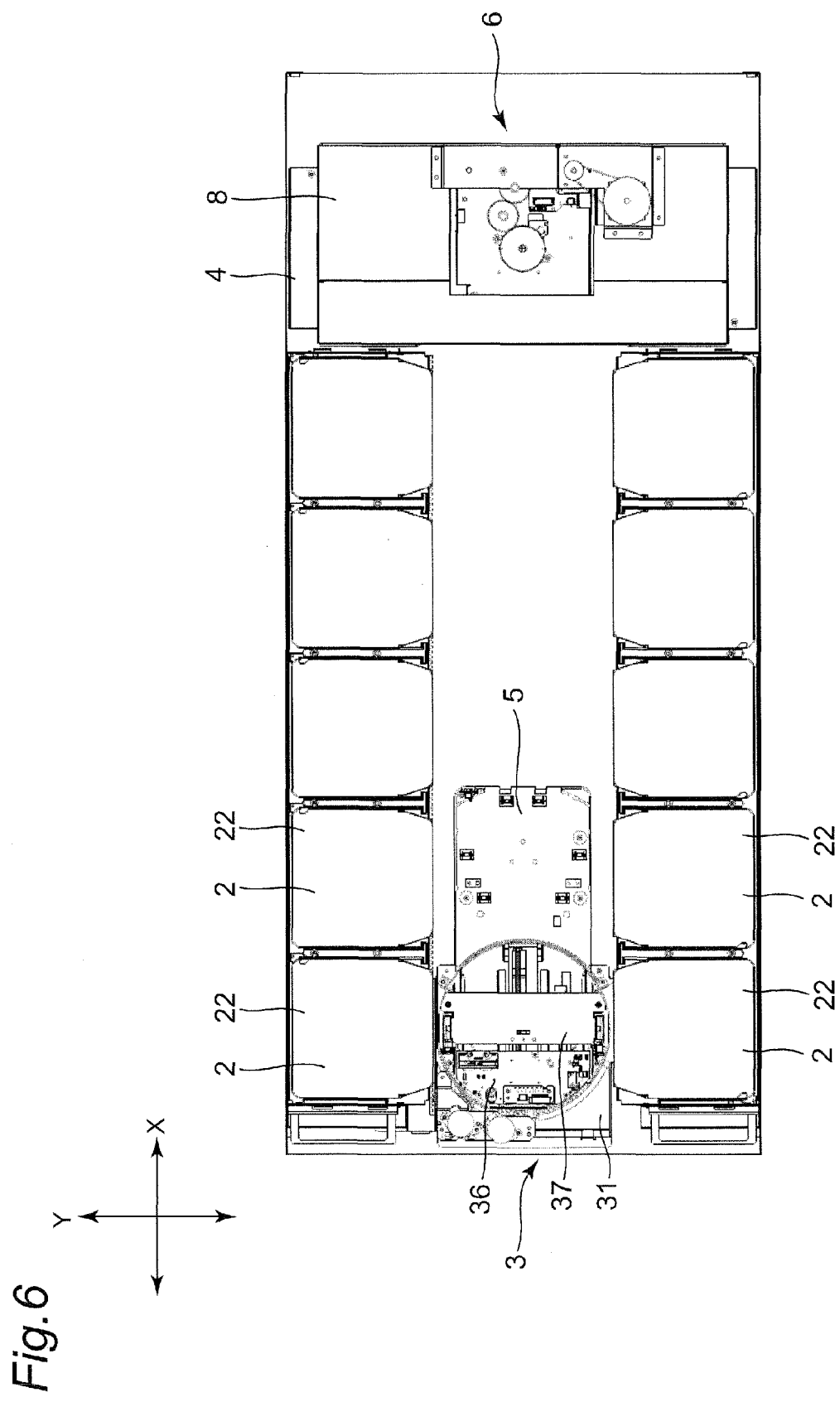
FIG. 6 is a plan view showing the picker in FIG. 3 moved to the front of a magazine selected from a plurality of magazines.
Figure 7:
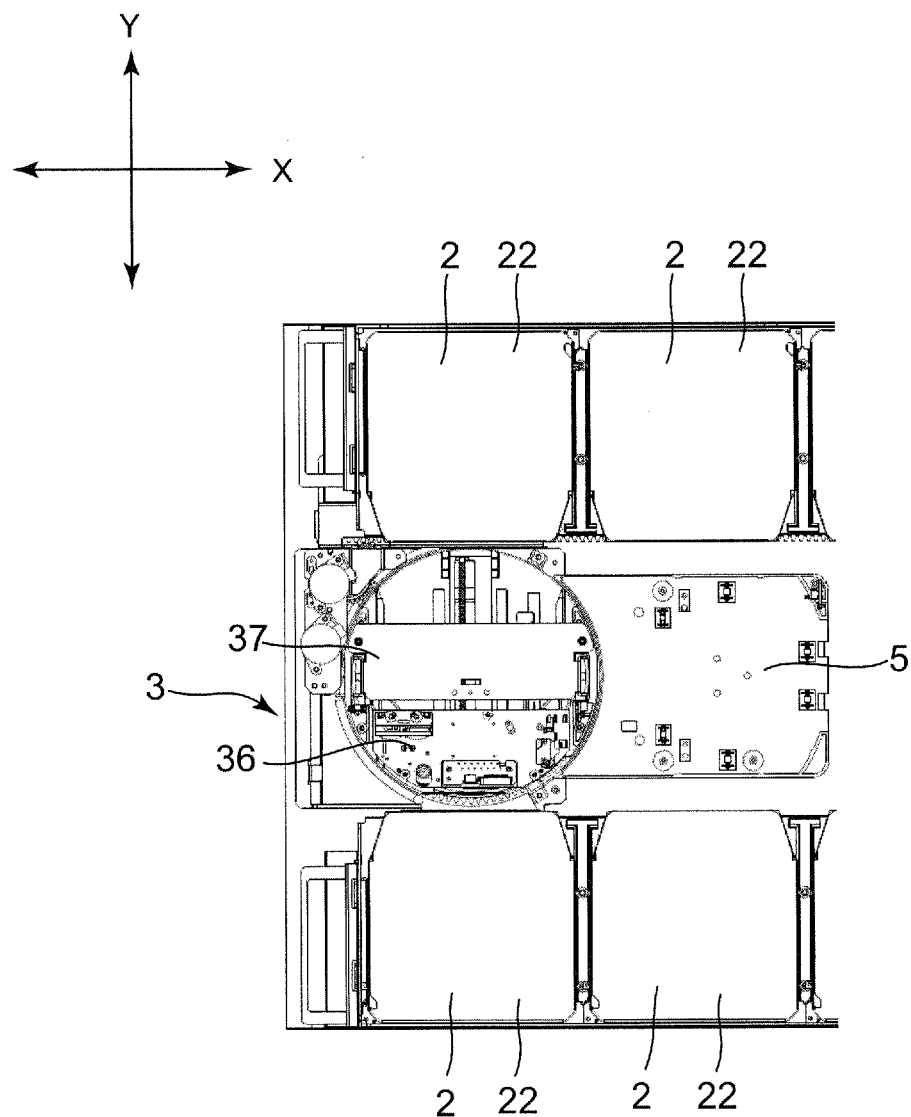
FIG. 7 is a plan view showing a state where the picker in FIG. 3 ejects the magazine tray from the magazine.

FIGS. 6 to 12 each show the manner of the picker 3 drawing out the magazine tray 21 from the case 22. As the run base 31 runs in the device depth direction X and the up-and-down table 34 rises and lowers in the device height direction Z along the pair of up-and-down rails 33, as shown in FIG. 6, the picker 3 shifts to the location at the front of one magazine 2 selected from a plurality of magazines 2. Further, as shown in FIG. 7, the rotary table 32 is rotated so that the chuck 36 is oriented to the front side of the magazine 2.

Figure 9:
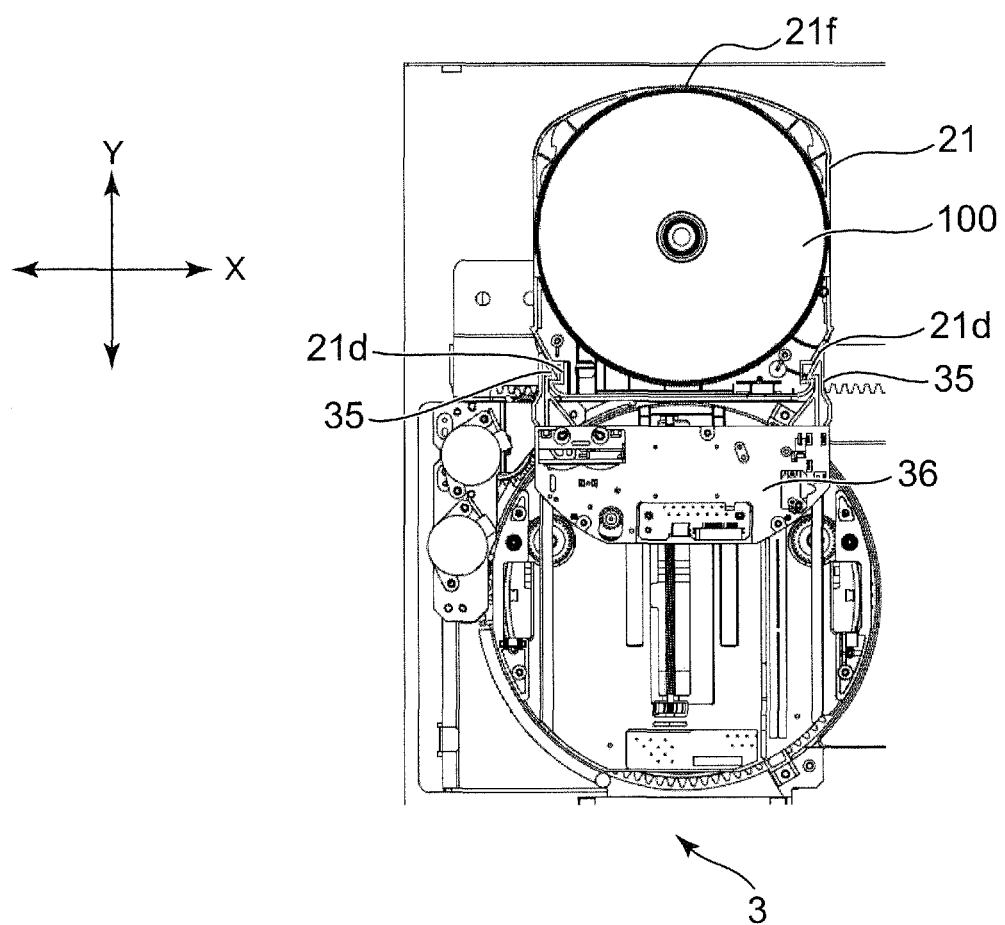
FIG. 9 is a plan view showing a state where the picker in FIG. 3 ejects the magazine tray from the magazine.

Thereafter, as shown in FIG. 8, the chuck 36 advances toward the magazine tray 21, whereby, as shown in FIG. 9, the pair of hooks 35, 35 is engaged with the engaging recess portions 21d, 21d of the magazine tray 21. In this state, by the chuck 36 receding from the case 22, the magazine tray 21 is drawn out from the case 22.

Figure 10:
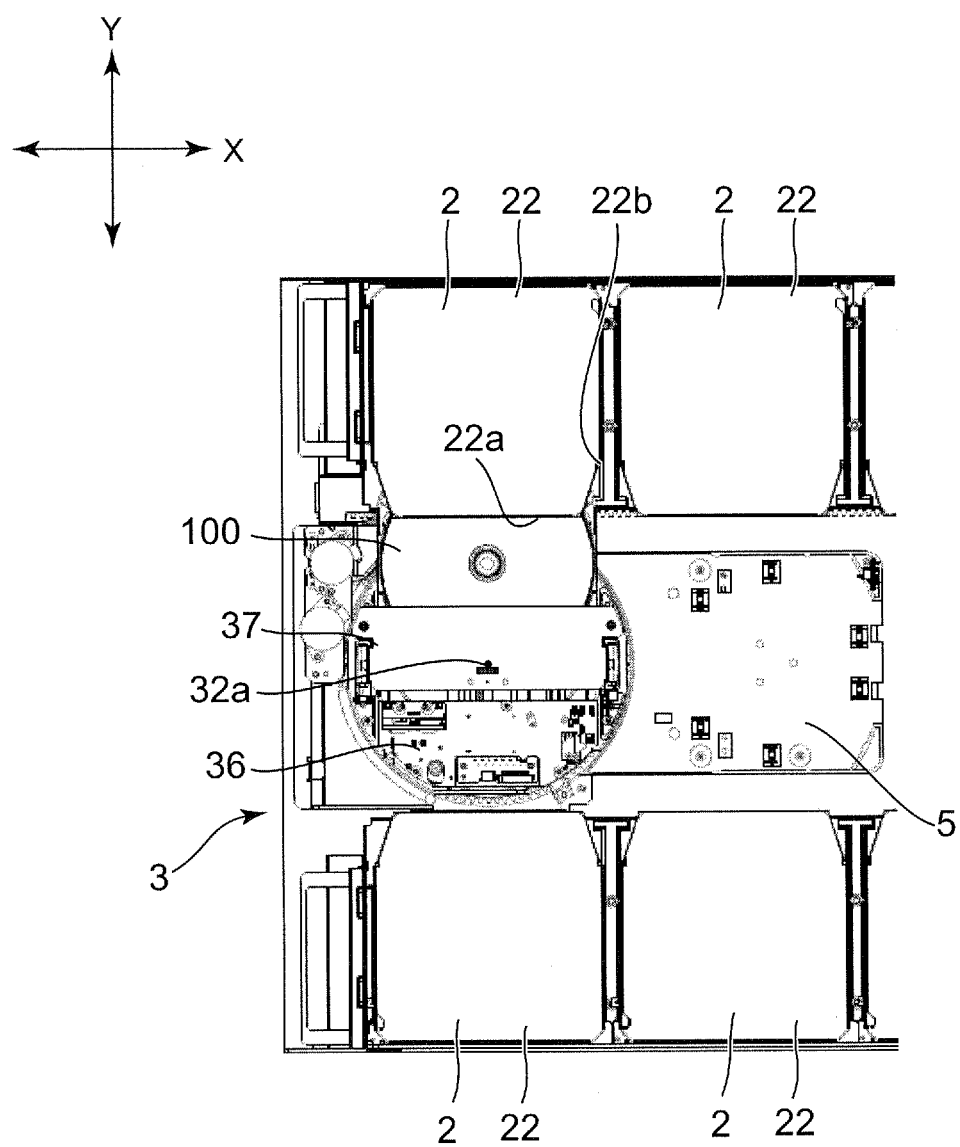
FIG. 10 is a plan view showing a state where the picker in FIG. 3 ejects the magazine tray from the magazine.
Figure 11:
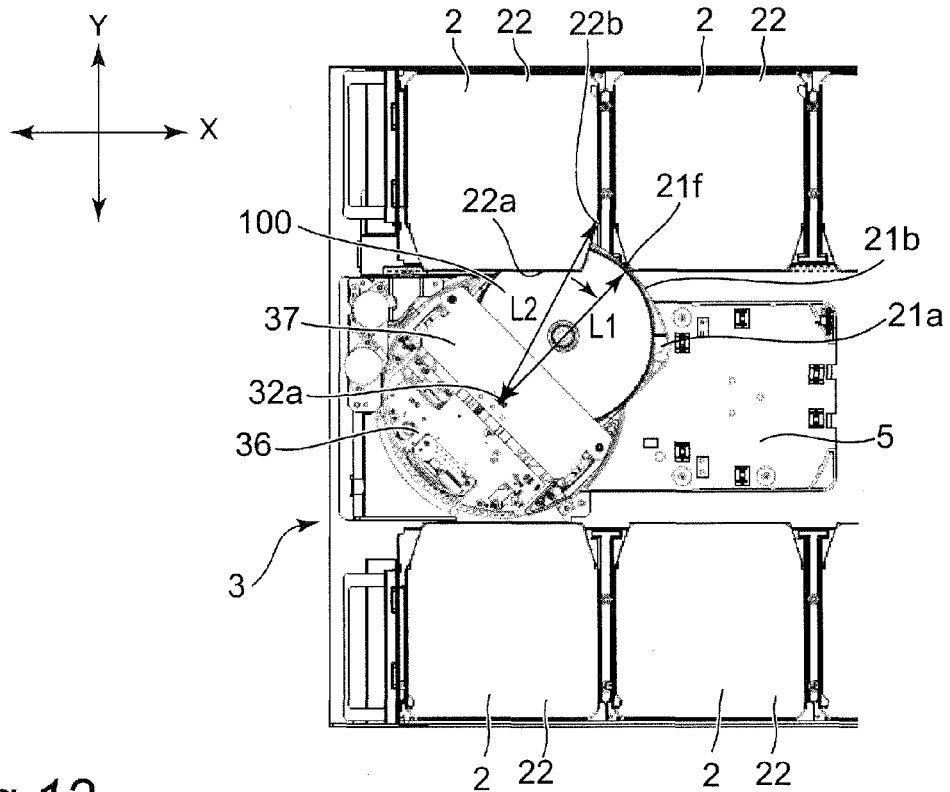
FIG. 11 is a plan view showing a state where the picker in FIG. 3 ejects the magazine tray from the magazine.
Figure 12:
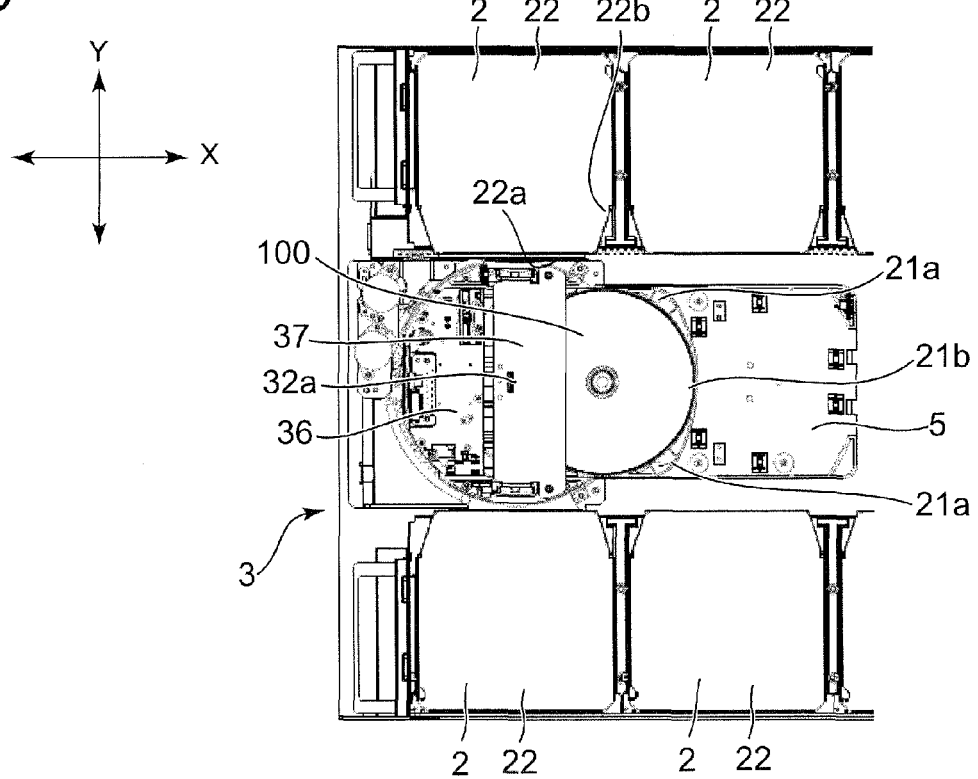
FIG. 12 is a plan view showing a state where the picker in FIG. 3 has ejected the magazine tray from the magazine.

As shown in FIG. 10, by the chuck 36 receding (i.e., shifting to the location at the front of the case 22), after the cut portions 21a of the magazine tray 21 pass through the opening 22a of the case 22, the rotary table 32 rotates clockwise substantially about the rotation axis 32a. In other words, as shown in FIG. 11, when the distance L1 between a vertex 21f (i.e., the position farthest from the rotation axis 32a) of the side face 21b of the magazine tray 21 and the rotation axis 32a becomes smaller than the distance L2 between the front end portion 22b of the side face of the case 22 and the rotation axis 32a, the rotary table 32 rotates clockwise substantially about the rotation axis 32a. In accordance with the rotation of the rotary table 32, as shown in FIGS. 11 and 12, the magazine tray 21 rotates substantially about the rotation axis 32a. As a result, as shown in FIG. 12, the magazine tray 21 is completely drawn out from the case 22.

As shown in FIG. 12, the magazine tray 21 drawn out from the case 22 is conveyed to the location near the plurality of disc drives 4 as shown in FIG. 13, by the run base 31 of the picker 3 running to the device-rear side. Thereafter, the chuck 36 of the picker 3 advances, and the magazine tray 21 is placed at a prescribed position on the magazine tray guide 51 (refer to FIG. 1) at the top of the lifter 5.

Next, detail configurations of the magazine stocker 1 and the magazine box 50 of the disc apparatus Da in accordance with this embodiment will be described.

Figure 14A:
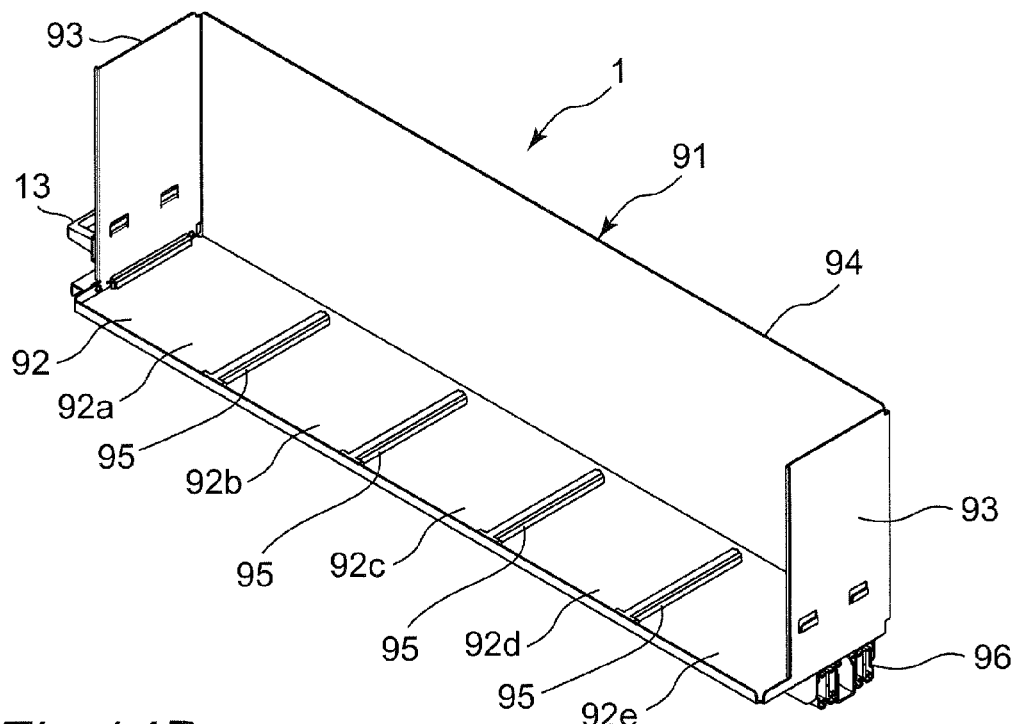
FIG. 14A is a perspective view showing a schematic configuration of the magazine stocker of the disc apparatus in FIG. 1.
Figure 14B:
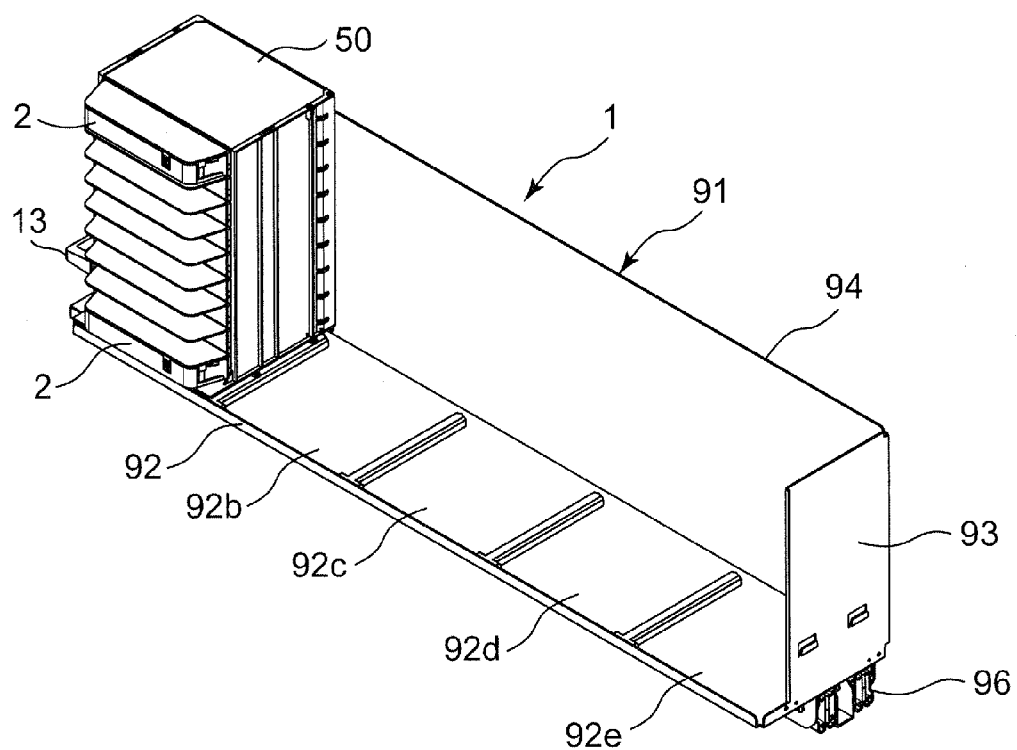
FIG. 14B is a perspective view showing a state where one magazine box is loaded to a part of the magazine stocker in FIG. 14A.

FIG. 14A is a perspective view showing a schematic configuration of the magazine stocker 1 of the disc apparatus Da in FIG. 1, and FIG. 14B is a perspective view showing a state where one magazine box 50 is loaded to a part of the magazine stocker 1 in FIG. 14A.

As shown in these figures, the magazine stocker 1 includes a chassis 91 (stocker chassis) that is formed of, for example, a steel plate and is configured of a bottom plate 92, a pair of front and rear side plates 93, 93, and a back plate 94. The stocker chassis 91 is configured to open to the side opposed to the back plate 94 (that is, the side on which the picker 3 is disposed) and the upper side. Four partitions 95 for partitioning an upper surface of the bottom plate 92 into five areas 92a to 92e are provided orthogonal to the longitudinal direction of the bottom plate 92. A pair of front and rear casters 96, 96 are attached to a lower surface of the bottom plate 92, and the user can pull the stocker chassis 91 with his/her hand on a grip 13, thereby causing the stocker chassis 91 to smoothly slide on the bottom chassis 11 of the disc apparatus Da (refer to FIG. 1).

The magazine box 50 is arranged in each of the five areas 92a to 92e partitioned by the four partitions 95. Thus, as shown in FIG. 1, the plurality of (in this embodiment, for example, five) magazine boxes 50 are stored in the chassis 91 of the magazine stocker 1, with the plurality of (in this embodiment, for example, nine) magazines 2 being vertically aligned in the substantially horizontal position and aligned in a depth direction X of the disc apparatus Da. The plurality of (in this embodiment, for example, 12) discs 100 are vertically stacked and stored in the magazine tray 21 of each magazine 2.

Since the pair of magazine stockers 1 are provided in a width direction Y of the disc apparatus, there are 10 magazine boxes 50 and 90 magazines 2 in total. Accordingly, 1080 discs in total are mounted in the magazine stockers 1, 1 of the disc apparatus Da. FIG. 14B shows the state where the magazine box 50 is mounted in only the area 92a. In order to clearly show the configuration of the magazine box 50 itself, FIG. 14B shows the state where the magazines 2 are stored in only the uppermost and lower most rows of the magazine box 50.

Figure 15:
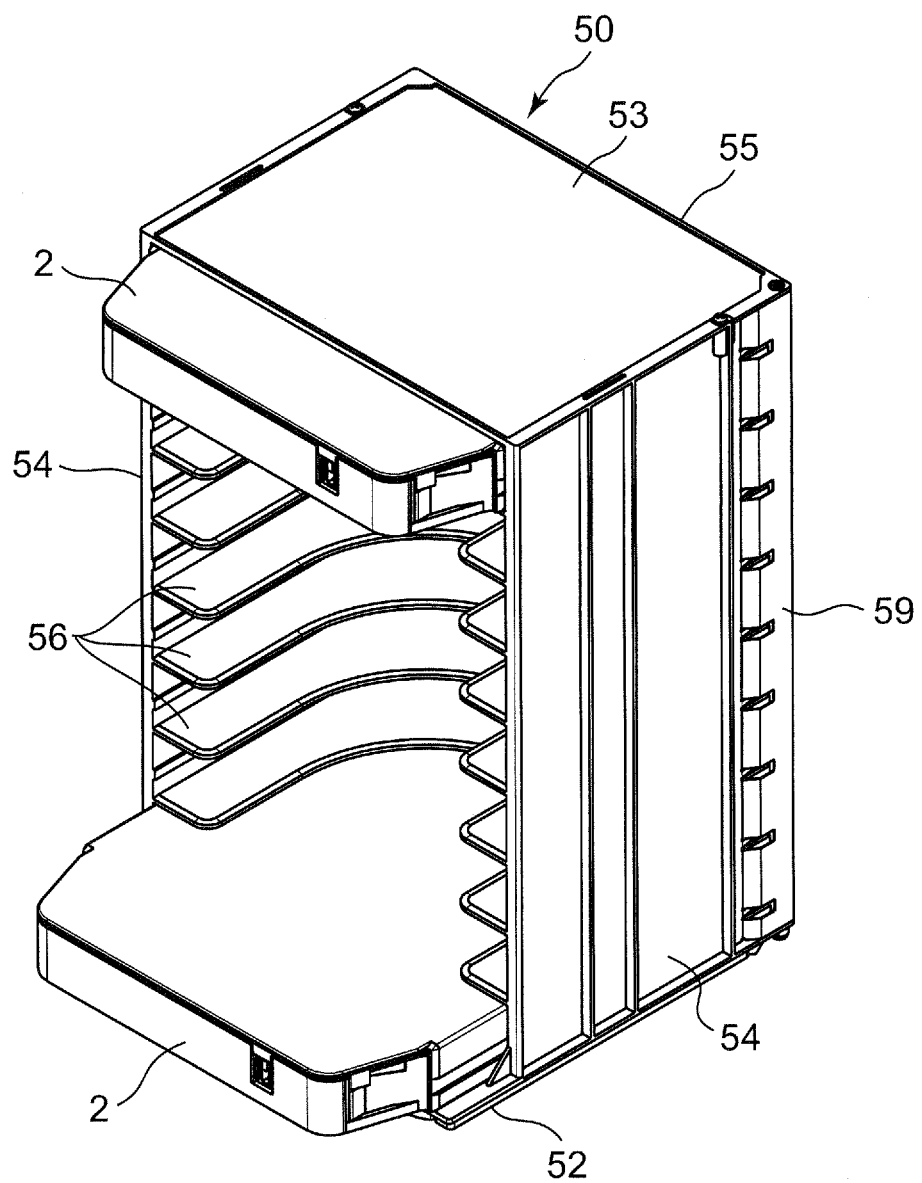
FIG. 15 is a perspective view showing an overall configuration of the magazine box mounted in the magazine stocker.
Figure 16:
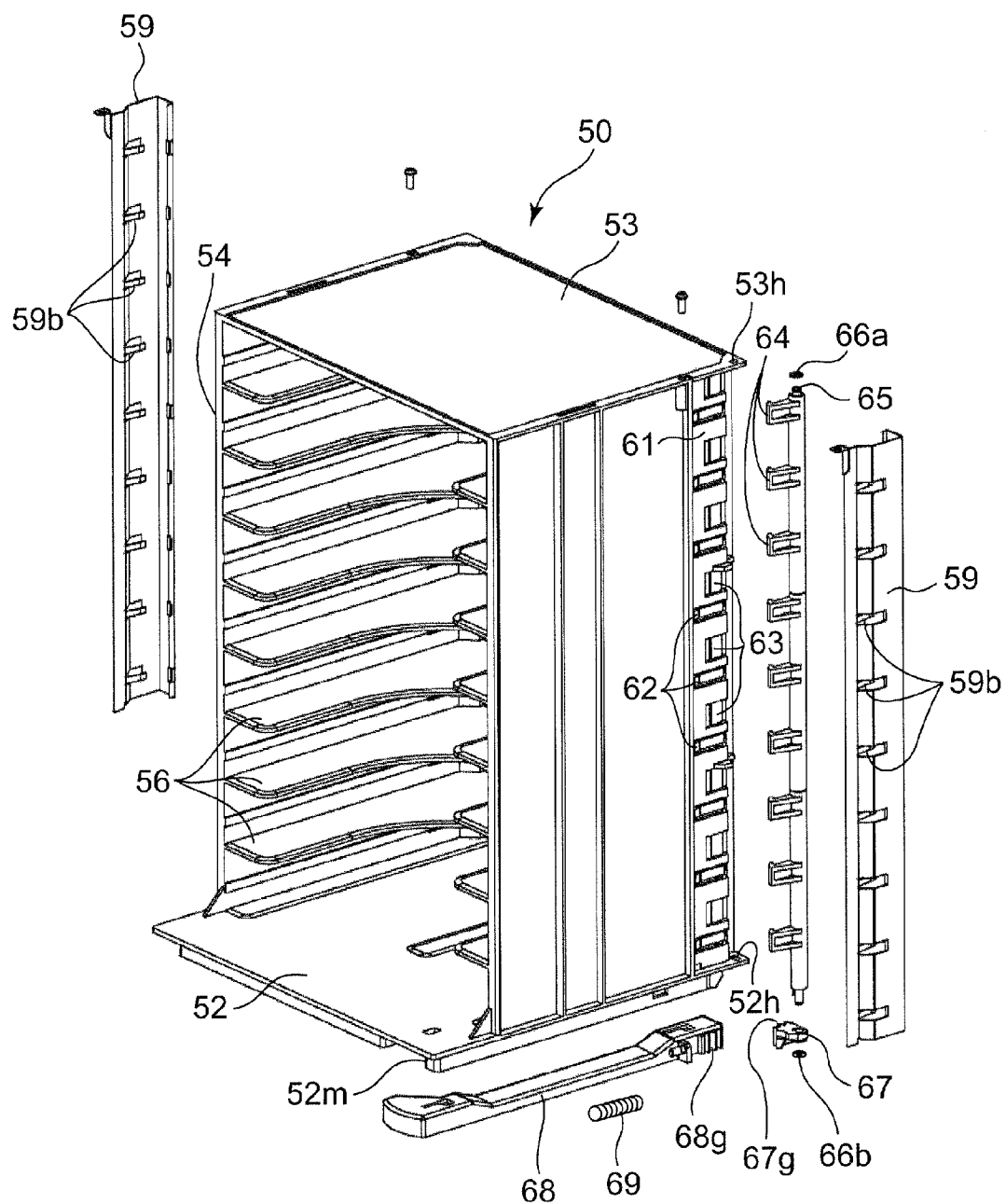
FIG. 16 is an exploded perspective view showing an overall configuration of the magazine box in FIG. 15.

FIG. 15 is a perspective view showing an overall configuration of the magazine box 50 mounted in each of the magazine stockers 1, 1. FIG. 16 is an exploded perspective view showing an overall configuration of the magazine box 50. FIG. 15 shows the state where the magazines 2 are stored in only the uppermost and lowermost rows of the magazine box 50.

As shown in these figures, magazine box 50 is shaped like a rectangular parallelepiped that is configured of a bottom plate 52 and a top plate 53, which are arranged in parallel to each other, and a pair of side plates 54 and a back plate 55, which vertically extend between the bottom plate 52 and the top plate 53, and opens only on the side opposed to the back plate 55 (that is, the side on which the picker 3 is arranged) According to the number of magazines 2 to be stored, a plurality of shelf plates 56 for receiving the stored magazines 2 are assembled to the magazine box 50. Main members of the magazine box 50 are made of, for example, synthetic resin.

Parts with a predetermined width in the side plates 54, 54 in the vicinity of the back plate 55 constitute mechanism sections 61, 61 (mechanical actuation sections) formed by vertically arranging a plurality of (in this case, nine) resin spring plates 62 (resin springs) corresponding to space partitioned by the shelf plates 56. The mechanical actuation sections 61, 61 are formed on the parts of the side plates 54, 54 in the vicinity of the back plate 55. When the magazine 2 is normally stored in the magazine box 50, each of the resin springs 62 provided in the mechanical actuation section 61 biases the locking levers (A) 41 of the magazine 2 in the locking release direction to release the locked state of the magazine tray 21 to the case 22. Actions of the resin springs 62 will be described later in detail.

A rectangular window 63 is formed immediately above each of the resin springs 62 in one of the pair of mechanical actuation section 61 (right one in FIG. 16). A claw rotating shaft 65 formed by integrally arranging a plurality of claws 64 (hereinafter referred to as locking claws (C)) corresponding to the windows 63 in the vertical direction are arranged on the outer side of the mechanical actuation section 61. The locking claws (C) 64 releasably lock each of the cases 22 of the plurality of magazines 2 to the magazine box 50.

Both ends of the claw rotating shaft 65 have respective circumferential grooves to which cut washers 66a, 66b can be fixed. The upper end of the claw rotating shaft 65 is inserted into a hole 53h of the top plate 53, and is rotatably supported by the hole 53h. The lower end of the claw rotating shaft 65 is inserted into a hole 52h of the bottom plate 52, is rotatably supported by the hole 52h, and is integrally provided with a rotating gear 67 together with the locking claw (C) 64. The claw rotating shaft 65 inserted into the holes 53h, 52h are fixed by the cut washers 66a, 66b at both ends. A tooth 67g of the rotating gear 67 is oriented inward.

A groove 52m of a predetermined width, which extends in the direction parallel to the side plates 54, is formed in a back surface of the bottom plate 52 of the magazine box 50, and an operating lever 68 for rotatingly operating the claw rotating shaft 65 is stored in the groove 52m so as to be slidable in the extending direction of the groove 52m. A driving tooth 68g engaging with the tooth 67g of the rotating gear 67 is formed at a front end of the operating lever 68. A biasing spring 69 (hereinafter referred to as biasing spring (C)) for biasing the operating lever 68 in the locking direction is attached to the operating lever 68. The biasing spring (C) 69 is formed of, for example, a coil spring. The locking claws (C) 64, the claw rotating shaft 65, and the biasing spring (C) 69 constitute main parts of the locking mechanism (C). The locking mechanism (C) corresponds to a "second locking mechanism" in this disclosure.

The outer side of the mechanical actuation section 61 including the claw rotating shaft 65 is covered with a thin plate-like cover member 59 formed of, for example, a steel plate. By covering the outer side of the mechanical actuation section 61 with the cover member 59 in this manner, the operating mechanism of the magazine box 50 can be prevented from being exposed to the outside, which improves appearance of the magazine box 50.

The cover member 59 has plate springs 59b at places corresponding to the resin springs 62 of the mechanical actuation section 61. The plate springs 59b each are formed by cutting a base material of the cover member 59 into a strip shape. As described later, when the resin springs 62 bias the locking levers (A) 41 to release the locked state, a certain load is applied to the resin springs 62. When this state continues for a long time, the resin springs 62 may be plastic-deformed by creep or the like. To prevent such a situation in this embodiment, the plate springs 59b of the cover member 59 aid the spring action of the resin springs 62 to protect the resin springs 62.

Next, the action of the resin springs 62 as the biasing means for biasing the locking levers (A) 41 of the locking mechanism (A) in the locking release direction will be described in detail.

Figure 17A:
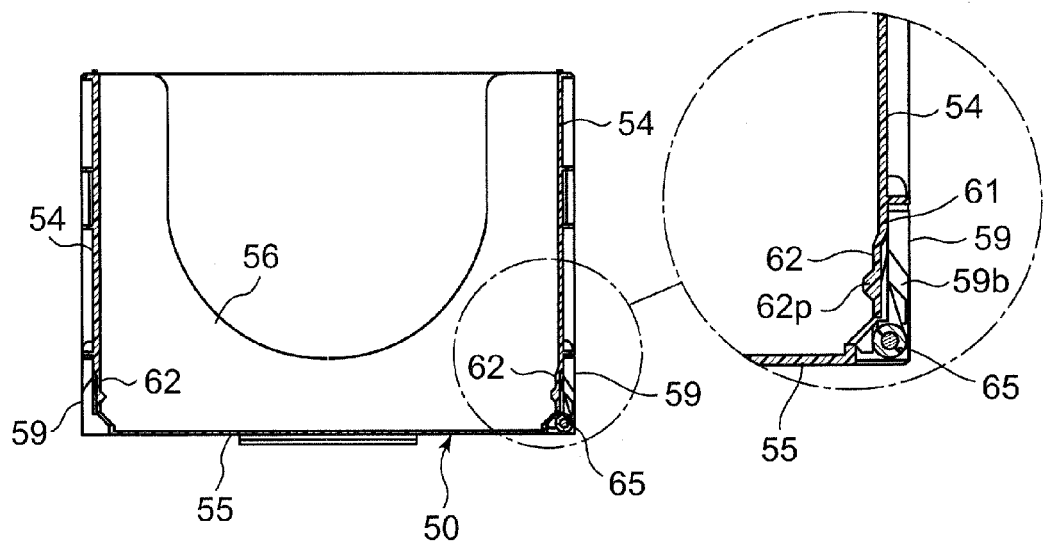
FIG. 17A is a transverse cross-sectional view of the magazine box for describing the action of resin springs.
Figure 17B:
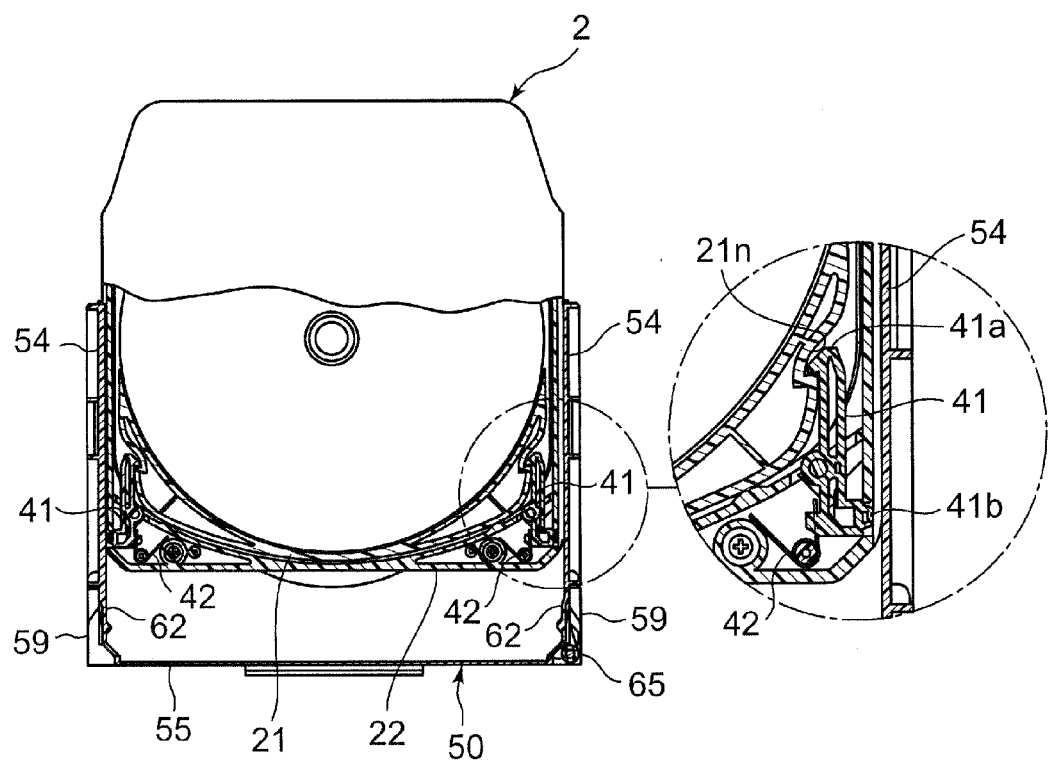
FIG. 17B is a transverse cross-sectional view showing the magazine box in FIG. 17A immediately before loading of the magazine.
Figure 17C:
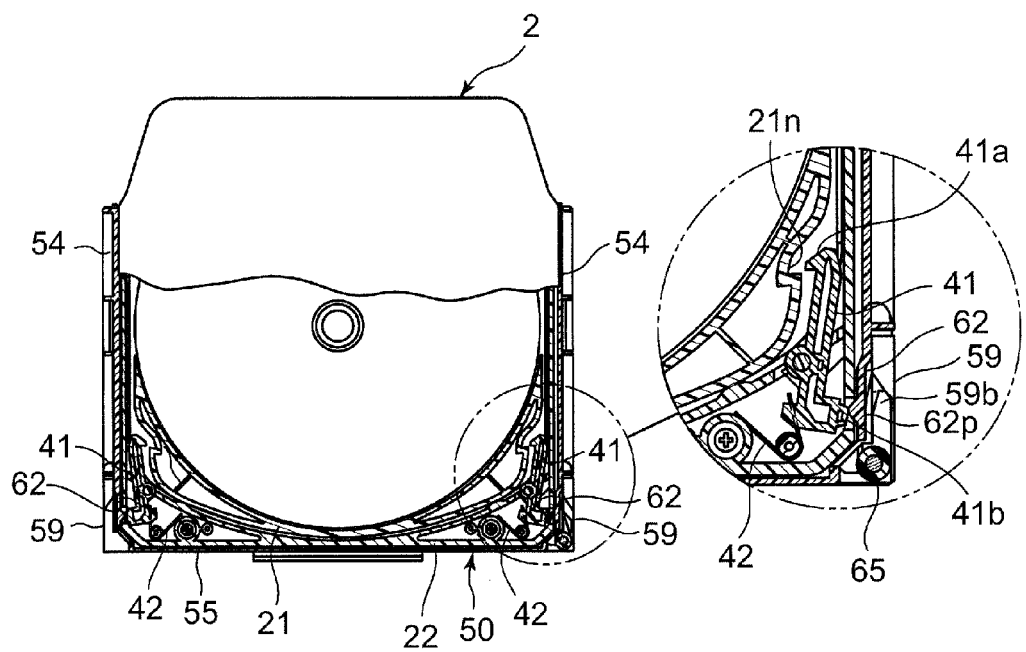
FIG. 17C is a transverse cross-sectional view showing the magazine box in FIG. 17A after loading of the magazine.
Figure 17D:
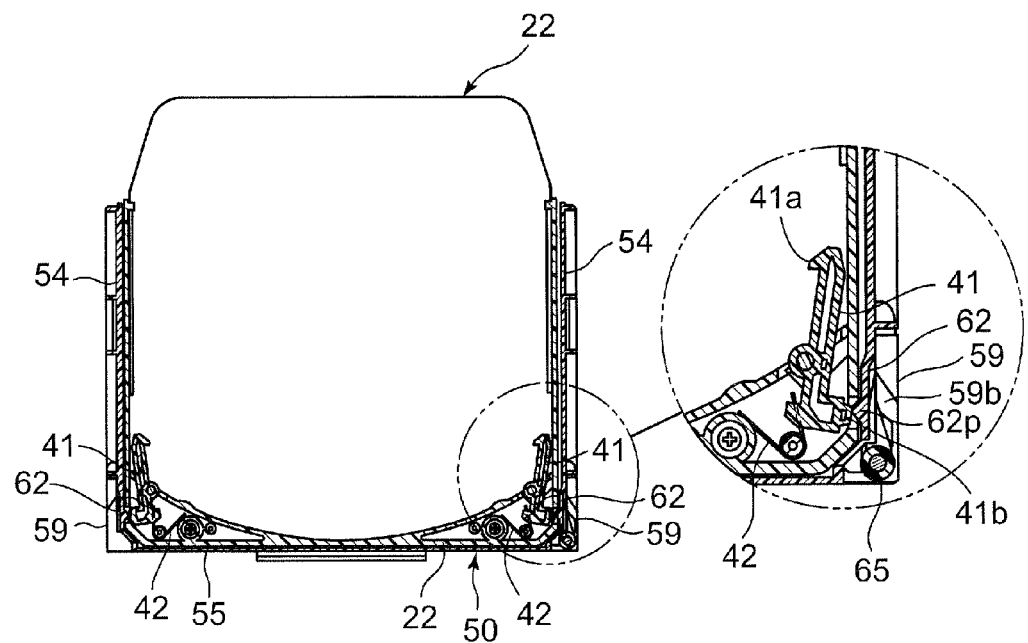
FIG. 17D is a transverse cross-sectional view showing the magazine box in FIG. 17A after ejection of the magazine tray.

FIG. 17A is a transverse cross-sectional view of the magazine box 50 for describing the action of the resin springs 62, FIG. 17B is a transverse cross-sectional view showing the magazine box 50 in FIG. 17A immediately before loading of the magazine, FIG. 17C is a transverse cross-sectional view showing the magazine box 50 in FIG. 17A after loading of the magazine, and FIG. 17D is a transverse cross-sectional view showing the magazine box 50 in FIG. 17A after ejection of the magazine tray.

As shown in FIG. 17A and FIG. 17B, while the magazine 2 (thus, the case 22) is not loaded in the magazine box 50, no load is applied to the resin springs 62. Then, as shown in FIG. 17C, when the magazine 2 is normally loaded in the magazine box 50, the receiving parts 41b of the locking levers (A) 41 provided in the case 22 of the magazine 2 interfere with protrusions 62p of the resin springs 62, resulting in that front ends of the resin springs 62 are bent outward, pressing (biasing) the receiving parts 41b of the locking levers (A) 41 inward as a reaction.

Thereby, the locking levers (A) 41 rotates in the locking release direction against the biasing force of the biasing springs (A) 42, and the locking claws 41a are detached from the claw engaged parts 21*n* of the magazine tray 21 to release locking of the magazine tray 21 to the case 22. That is, merely by normally loading the magazine 2 into the magazine box 50, locking of the magazine tray 21 to the case 22 by means of the locking mechanism (A) is released.

However, at this time, since the locked state achieved by the locking mechanism (B) (the locking lever (B) 43 and the biasing spring (B) 44) is maintained, the operator cannot manually eject the magazine tray 21 from the case 22. Further, in this state, since the case 22 is locked to the magazine box 50 by the locking mechanism (C) (the locking claws (C) 64, the claw rotating shaft 65, and the biasing spring (C) 69), the case 22 cannot be ejected from the magazine box 50.

When the picker 3 of the disc apparatus Da ejects the magazine tray 21, as described above, locking of the magazine tray 21 to the case 22 by the locking mechanism (B) is released and therefore, the magazine tray 21 can be automatically ejected with ease. As a result, as shown in FIG. 17D, only the case 22 is locked and remained in the magazine box 50.

At this time, an enough load to rotate the locking levers (A) 41 in the locking release direction is applied to the resin springs 62, and this state continues for a certain period or more. In this embodiment, however, the plate springs 59*b* of the cover member 59 aid the spring action of the resin springs 62 as described above, preventing plastic deformation of the resin springs 62 due to creep or the like.

Next, the case of releasing the locked state of the case 22 to the magazine box 50 by means of the locking mechanism (C) (the locking claws (C) 64, the claw rotating shaft 65, and the biasing spring (C) 69) will be described below.

Figure 18B:
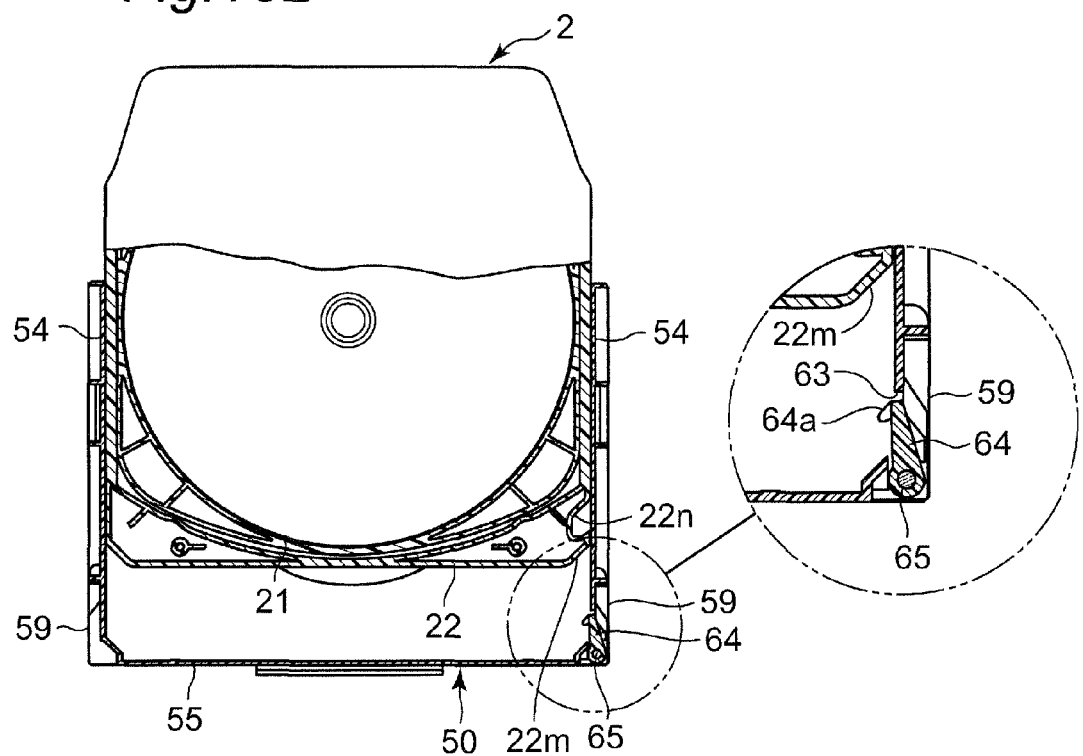
FIG. 18B is a transverse cross-sectional view showing the magazine box in FIG. 18A immediately before loading of the magazine.
Figure 18C:
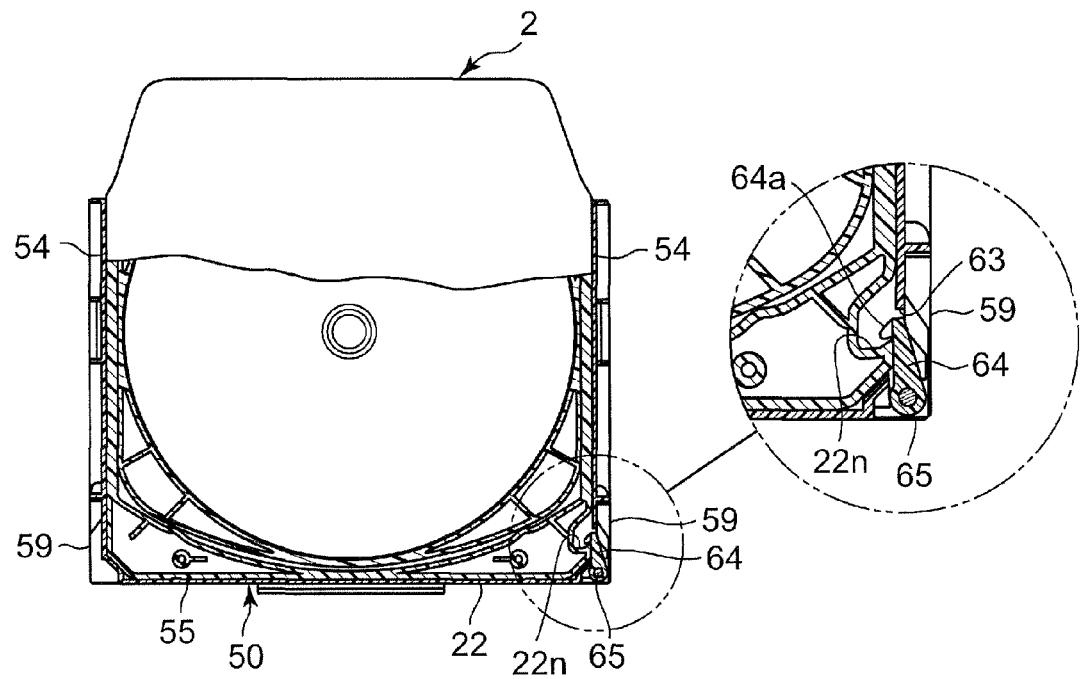
FIG. 18C is a transverse cross-sectional view showing the magazine box in FIG. 18A after loading of the magazine.

FIG. 18A are a transverse cross-sectional view showing the magazine box 50 for describing the operation of the locking claws (C) 64 of the locking mechanism (C), and a bottom view showing the state of the operating lever 68 in the magazine box 50 at this time. FIG. 18B is a transverse cross-sectional view showing the magazine box 50 in FIG. 18A immediately before loading of the magazine, and FIG. 18C is a transverse cross-sectional view showing the magazine box 50 in FIG. 18A after loading of the magazine. FIG. 18D are a transverse cross-sectional view showing the magazine box 50 in FIG. 18A in the released state of locking of the locking mechanism (C), and a bottom view showing the state of the operating lever 68 in the magazine box 50 at this time.

As shown in FIG. 18A (a) and FIG. 18B, even when the magazine 2 (thus, the case 22) is not loaded in the magazine box 50, a claw front end 64*a* of the locking claw (C) 64 is kept at a locked position at which the claw front end 64*a* protrudes inward from the window 63 of the mechanical actuation section 61 on the side plate 54 of the magazine box 50, by the action of the biasing spring (C) 69. In this state, as shown in FIG. 18A (b), the operating lever 68 is located at the position closest to the back surface in the groove 52*m* formed in the bottom plate 52 of the magazine box 50.

When the magazine 2 is inserted and stored in the magazine box 50 from the state shown in FIG. 18B, an inclined surface 22*m* formed in the vicinity of a claw engaging part 22*n* formed on the back surface of the case 22 presses the claw front end 64*a* of the locking claw (C) 64 outward to insert the magazine 2. Thereby, the locking claw (C) 64 rotates against the biasing force of the biasing spring (C) 69, resulting in that the claw front end 64*a* is fitted into the claw engaging part 22*n* while being guided on the inclined surface 22*m*. As a result, as shown in FIG. 18C, the case 22 of the magazine 2 is locked and stored in the magazine box 50.

When the magazine box 50 is ejected from the magazine stocker 1 to eject the magazine 2 together with the case 22 (that is, integrally with the case 22), as shown in FIG. 18D (b), the operating lever 68 is slid in the groove 52*m* of the bottom plate 52 in a direction opposite to the back surface (direction represented by an arrow F4 in FIG. 18D (b)) against the biasing force of the biasing spring (C) 69. This rotates the rotating gear 67 having the tooth 67*g* to be engaged with the driving tooth 68*g* of the operating lever 68 via the driving tooth 68*g* by a predetermined amount in the locking release direction. Accordingly, the claw rotating shaft 65 and the locking claw (C) 64 rotate in the same direction, and the claw front end 64*a* is put into a locking released state where the claw front end 64*a* is escaped outward from the window 63 of the side plate 54 of the magazine box 50 (refer to FIG. 18D (a)). In this manner, the operating lever 68 is slid in the locking release direction against the biasing force of the biasing spring (C) 69, and the magazine 2 together with the case 22 can be ejected while keeping this sliding position.

As has been described, in the magazine box 50 in this embodiment, the locking mechanism (B) can lock the magazine tray 21 to the case 22 under the normal condition in which the magazine tray 21 is to be stored in the case 22, without interfering the smooth ejecting operation of the picker 3 of the disc apparatus Da, thereby reliably preventing manual ejection of the magazine tray 21 from the case 22 by the user. Further, the locking mechanism (C) can reliably lock the case 22 of the magazine 2 to the magazine box 50 at least during the operation of the picker 3 to automatically eject only the magazine tray 21.

In this case, the locking mechanism (C) includes the plurality of locking claws (C) 64 engageable with the respective cases 22 of the plurality of magazines 2 stored in the magazine box 50, and the magazine box 50 includes the operating lever 68 for operating the plurality of locking claws (C) 64 in the locking release direction at the same time. Therefore, in the case where the plurality of magazines 2 are stored in the magazine box 50, for all of the magazines 2, the locked state of the cases 22 to the magazine box 50 by means of the locking mechanism (C) can be released at the same time, which improves convenience.

Also, in this case, at least during the operation of the picker 3 (that is, during use in the disc apparatus Da), the magazine box 50 is placed on the bottom plate 92 of the magazine stocker 1 with the box bottom plate 52 being placed on the lower side, in the state where the plurality of magazine 2 are vertically stacked. By arranging the operating lever 68 of the locking mechanism (C) on the bottom surface of the box bottom plate 52, the operation of the operating lever 68 of the locking mechanism (C) can be reliably prevented during use in the disc apparatus Da.

Further, in the above described cases, by providing the locking mechanism (A) for unremovably locking the magazine tray 21 to the case 22 in the state where the magazine 2 is not stored in the magazine box 50, and releasing the locked state of the magazine tray 21 to the case 22 when the magazine 2 is normally stored in the magazine box 50, in the case where the magazine 2 is not stored in the magazine box 50, the magazine tray 21 can be locked to the case 22 more reliably, thereby more reliably preventing manual ejection of the tray from the case 22 by the user.

In this case, since the magazine box 50 is provided with the biasing springs (A) 42 for biasing the locking levers (A) 41 of the locking mechanism (A) in the locking release direction when the magazine 2 is normally stored in the magazine box 50, merely by normally storing the magazine 2 in the magazine box 50, the locked state of the magazine tray 21 to the case 22 by means of the locking mechanism (A) can be reliably released with the relatively simple configuration.

Also, in this case, the biasing springs (A) 42 bias the locking levers (A) 41 of each of the locking mechanisms (A) of the plurality of magazine 2 stored in the magazine box 50 in the locking release direction at the same time. Accordingly, in the case where the plurality of magazines 2 are stored in the magazine box 50, for all of the magazines 2, the locked state of the magazine tray 21 to the case 22 by means of the locking mechanism (A) can be released at the same time, which improves convenience.

In the above-mentioned case, the magazine tray 21 includes the core rod 23 inserted into central holes 100a of the plurality of stored discs 100, thereby preventing the discs 100 from being irregularly stacked and restricting the discs 100 from moving in the direction of disc surface to prevent damage of the discs 100.

Embodiment 2

Next, Embodiment 2 of this disclosure will be described with reference to FIG. 19 to FIG. 25. In following description, the same or equivalent parts as those in Embodiment 1 are given the same reference numerals, and redundant description thereof is omitted.

In Embodiment 1, the locking mechanism (A) is provided in each of both corners located on the side of the back surface of the case 22 when the magazine tray 21 is stored in the case 22. Briefly speaking, in Embodiment 2, one of the locking mechanisms (A) is replaced with a locking mechanism (D) having a different function.

Figure 19:
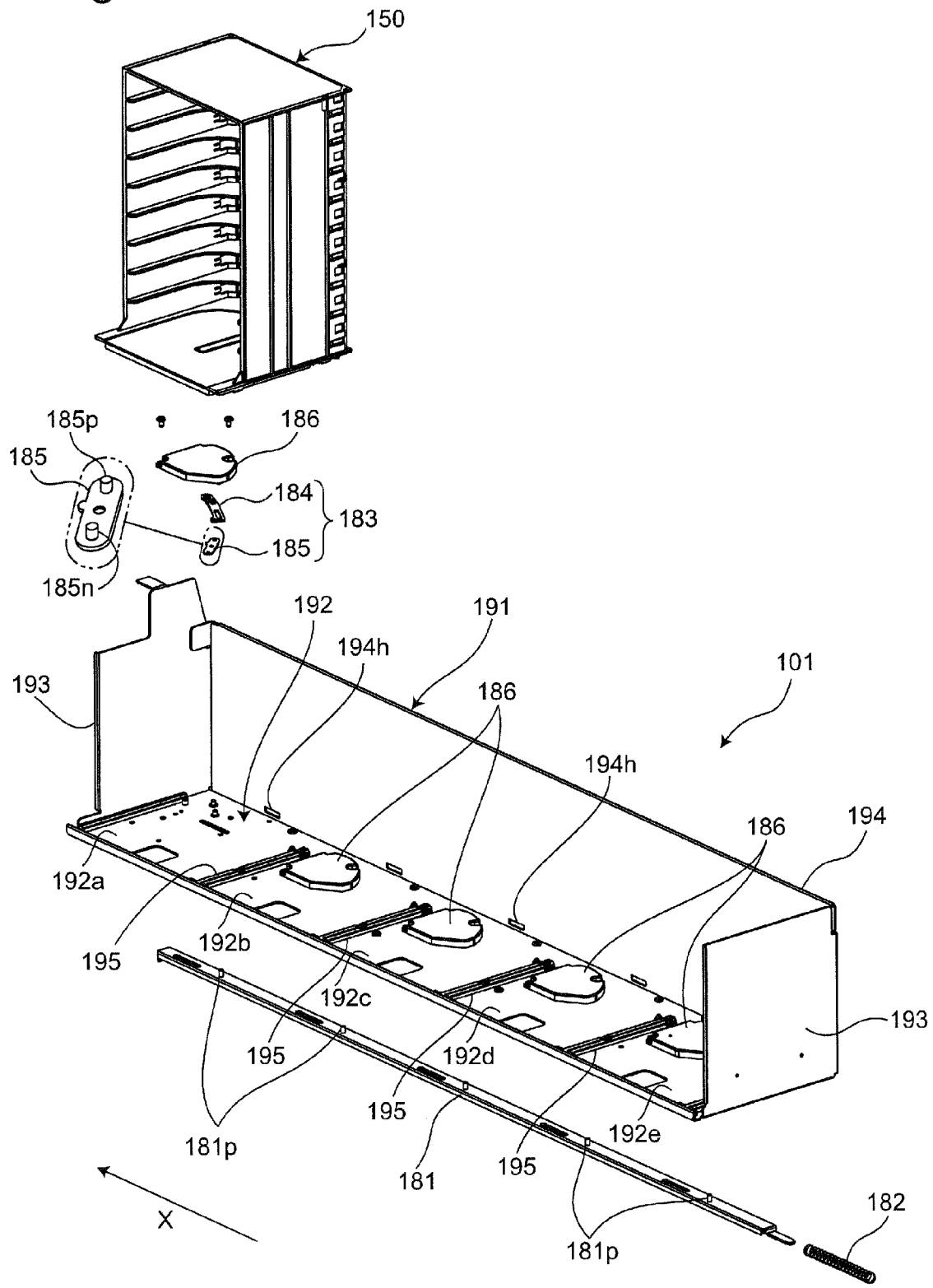
FIG. 19 is an exploded perspective view of a magazine stocker in accordance with Embodiment 2 in this disclosure.

FIG. 19 is an exploded perspective view of a magazine stocker 101 in accordance with Embodiment 2, and shows one located on the right side in the apparatus width direction orthogonal to the apparatus depth direction X, as an example. Left one has the substantially same configuration except for right and left reversal.

The magazine stocker 101 includes a plurality of (as in Embodiment 1, for example, five) magazine boxes 150 for removably storing a plurality of disc-storing magazines 102. The five magazine boxes 150 are aligned, in the apparatus depth direction X, on the bottom chassis 11 of the disc apparatus (refer to, for example, FIG. 1). The magazine box 150 can store the plurality of (as in Embodiment 1, for example, nine) magazines 102, which are vertically arranged in the substantially horizontal position, in the magazine stocker 101.

As shown in FIG. 19, the magazine stocker 101 is similar to the magazine stocker 1 in Embodiment 1 (refer to, for example, FIGS. 14A, and 14B) in overall basic configuration, and includes a chassis 191 (stocker chassis) that is formed of, for example, a steel plate, and is constituted of a bottom plate 192, a pair of front and rear side plates 193, 193, and a back plate 194. The stocker chassis 191 is configured to open to the side opposed to the back plate 194 (that is, the side on which the picker 3 is arranged) and the upper side. Four partitions 195 for partitioning an upper surface of the bottom plate 192 into five areas 192a to 192e extend orthogonally to the longitudinal direction of the bottom plate 192. Although not specifically shown, as in Embodiment 1, a pair of front and rear casters is provided on a lower surface of the bottom plate 192, and the side plate 193 on the near side of the apparatus has a grip for pulling.

The magazine box 150 is arranged in each of the five areas 192a to 192e partitioned by the four partitions 195. As in Embodiment 1, the plurality of (for example, five) magazine boxes 150 are aligned in the depth direction X of the disc apparatus Da and are stored in the chassis 191 of the magazine stocker 101.

The partitions 195 each have a positioning pin in the Y direction of the magazine boxes 150, and the positioning pin engages with a pair of grooves (for example, circular holes, long holes) formed in a back surface of a below-mentioned bottom plate 152 of the magazine boxes 150. Thus, even when the magazine box 150 is placed in any position of five areas 192a to 192e, a pin groove 167g of a rotating piece 167 disposed on the bottom surface of the magazine box 150 can be positioned with respect to a pin 185p of a below-mentioned second link member 185 arranged in each of the areas with high accuracy.

By sliding the magazine stocker 101 on the bottom chassis 11 of the disc apparatus Da (for example, refer to FIG. 1) in the depth direction X and causing a front end of the magazine stocker 101 to contact with the disc drive 4, the magazine box 150 mounted on the magazine stocker 101 can be located at a predetermined position of the disc apparatus. That is, the magazine stocker 101 corresponds to a "positioning member" in this disclosure.

A sliding bar 181 for operating the locking mechanism (D) described later in detail is provided on the back surface of the bottom plate 192 of the magazine stocker 101 so as to be slidable with respect to the back surface of the bottom plate 192 in the depth direction X of the disc apparatus Da. Protrusions 181p each having a predetermined height is provided at five positions on an upper surface of the sliding bar 181, which are spaced at regular intervals.

Figure 20:
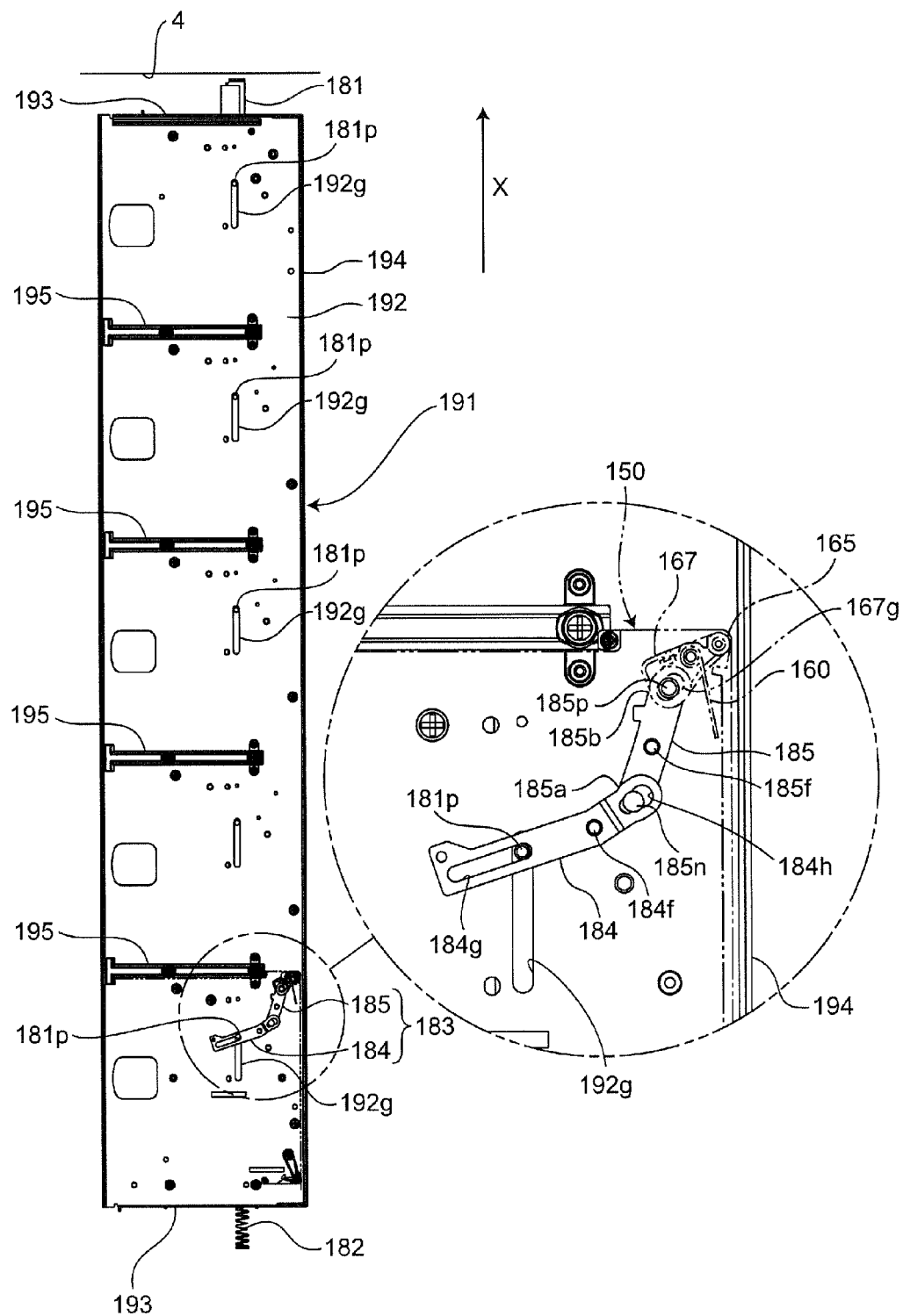
FIG. 20 is a plan view showing an unset state of the magazine stocker in FIG. 19.
Figure 21:
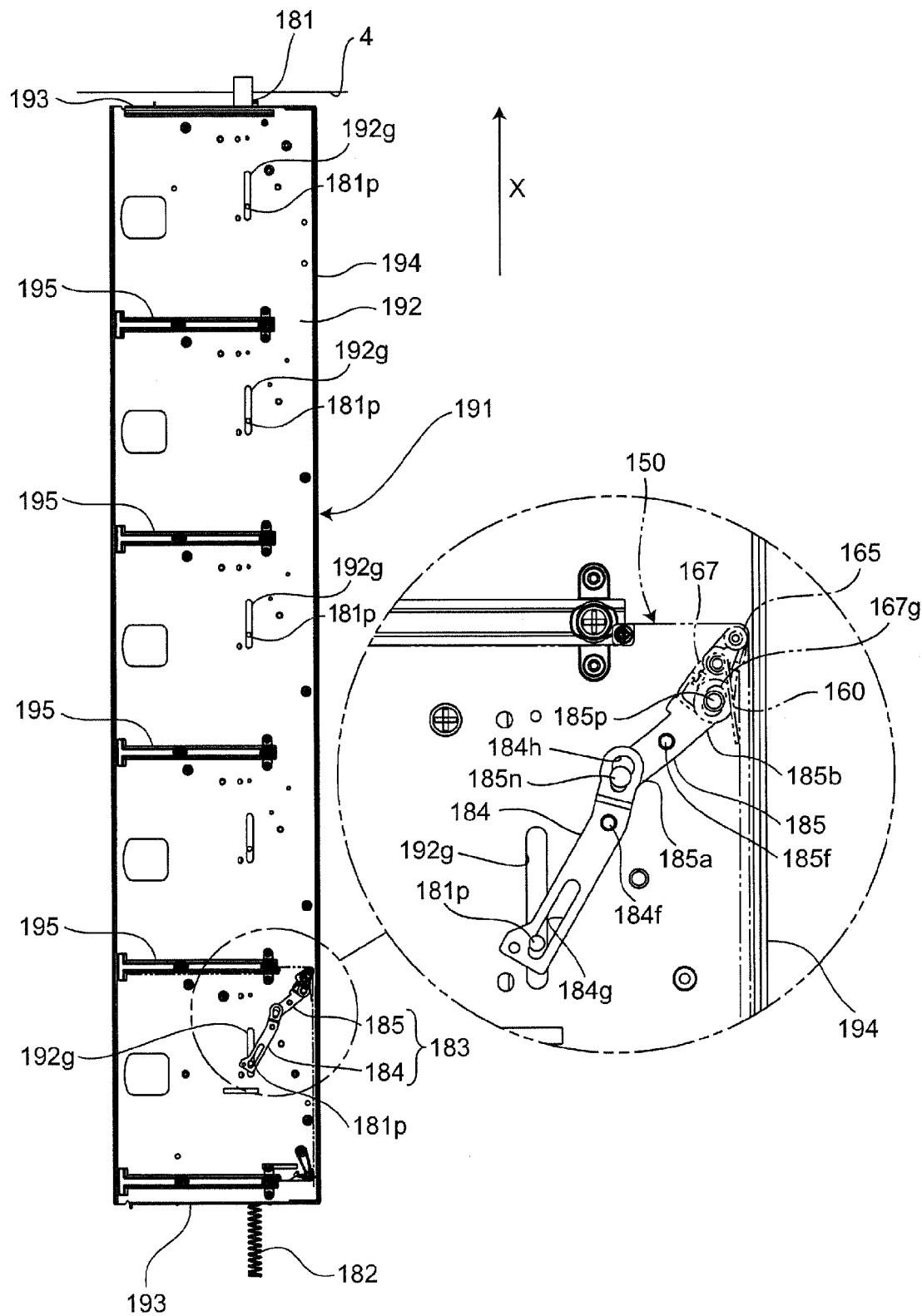
FIG. 21 is a plan view showing a set state of the magazine stocker in FIG. 19.

FIG. 20 is a plan view showing an unset state in which the magazine stocker 101 is not located at the predetermined position of the disc apparatus, and FIG. 21 is a plan view showing a set state in which the magazine stocker 101 is located at the predetermined position of the disc apparatus. As apparent from these figures, a long groove 192g for inserting the protrusion 181p of the sliding bar 181 thereinto is formed in each of the five areas 192a to 192e of the bottom plate 192, and when the sliding bar 181 slides in the depth direction X of the disc apparatus Da, each protrusion 181p can freely slide in the long groove 192g.

The sliding bar 181 protrudes from the front end of the bottom plate 192 of the magazine stocker 101 by a predetermined amount in the unset state of the magazine stocker 101. In this unset state, the protrusion 181p of the sliding bar 181 is located in the vicinity of a front end of the long groove 192g of the bottom plate 192 (refer to FIG. 20). Then, when the magazine stocker 101 is pressed in the apparatus depth direction X and is positioned, the front end of the sliding bar 181 comes into contact with the disc drive 4 and is pressed in the direction opposite to the depth direction X, thereby the sliding bar 181 slides in the direction opposite to the apparatus depth direction X by the pressed amount. Then, the protrusion 181p of the sliding bar 181 slides in the long groove 192g of the bottom plate 192 in the direction opposite to the apparatus depth direction X (refer to FIG. 21). A return spring 182 for biasing the sliding bar 181 in the set state to return to the unset state is provided at a rear end of the sliding bar 181 (end on the opposite side in the depth direction X).

A link mechanism 183 for operating the below-mentioned locking mechanism (D) is arranged in the vicinity of the long groove 192g of the bottom plate 192 in each of the five areas 192a to 192e. In this example, the link mechanism 183 includes two link members: a first link member 184 and the second link member 185. The protrusion 181p of the sliding bar 181 is inserted into the long groove 192g of the bottom plate 192 and further slidably inserted into a long groove 184g formed in one end of the first link member 184. The first link member 184 is rotatably attached to the bottom plate 192 with a fixing pin 184f. An engaging hole 184h provided in the other end of the first link member 184 engages with an engaging pin 185n of the second link member 185.

Further, the second link member 185 is rotatably attached to the bottom plate 192 with a fixing pin 185f. An engaging pin 185p provided in the other end 185b of the second link member 185 is rotatably engaged with the pin groove 167g of the below-mentioned rotating piece 167. The link mechanism 183 is arranged on the bottom plate 192, and is covered with a link cover 186. The link cover 186 is screwed into the bottom plate 192.

Figure 22:
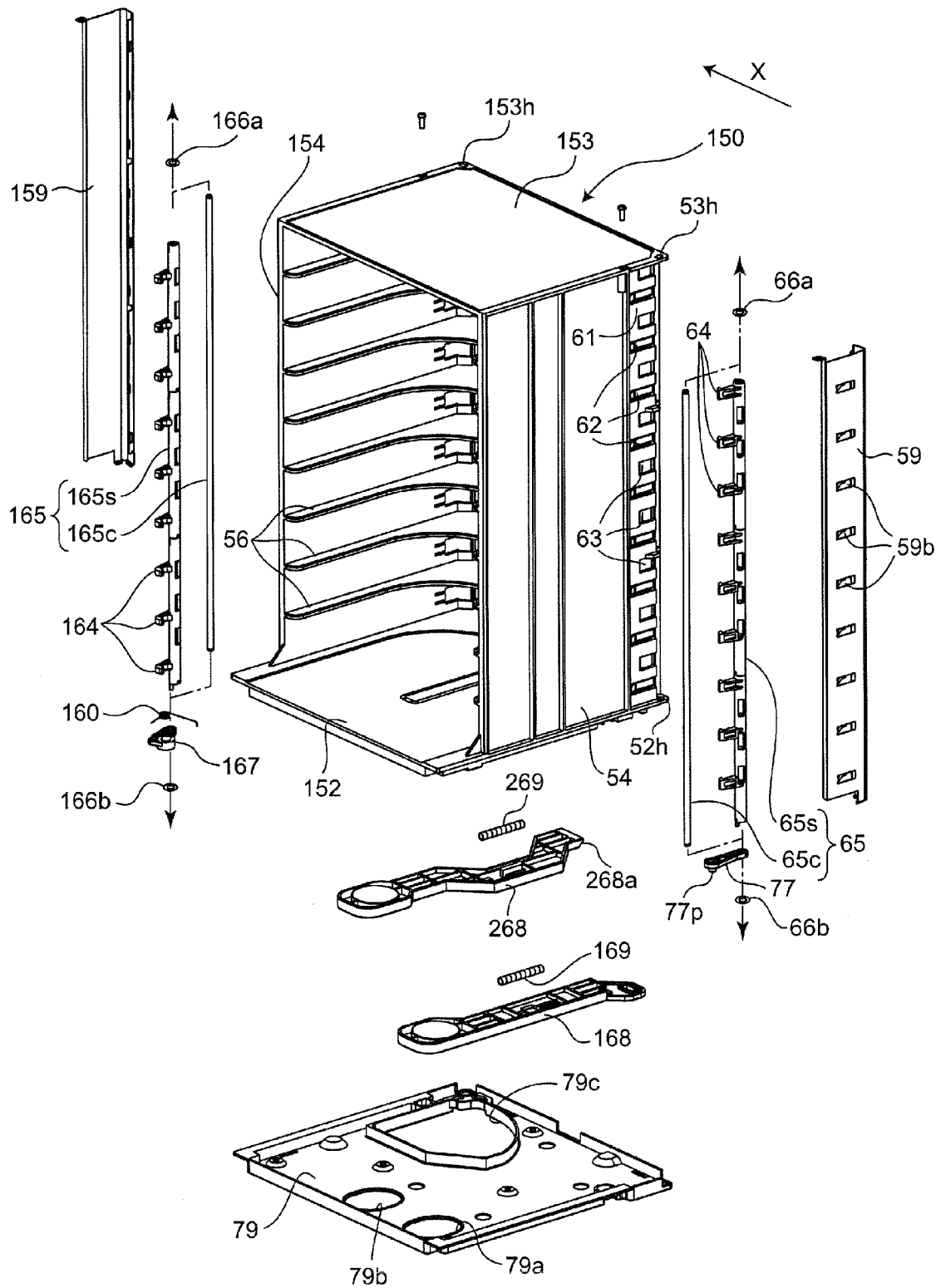
FIG. 22 is an exploded perspective view showing a magazine box in accordance with Embodiment 2 in this disclosure.

FIG. 22 is an exploded perspective view showing a schematic configuration of the magazine box 150 mounted in the magazine stocker 101 in accordance with Embodiment 2. The magazine box 150 is similar to the magazine box 50 in Embodiment 1 (for example, refer to FIG. 16) in overall basic configuration. In Embodiment 1, the locking mechanism (A) is provided in each of both corners located on the side of the back surface of the case 22 when the magazine tray 21 is stored in the case 22. In Embodiment 2, however, one of the locking mechanisms (A) (at the corner on the side of the apparatus depth direction X) is replaced with a locking mechanism (D) having a different function.

As shown in FIG. 22, the magazine box 150 includes the substantially same side plate 54 on one side (the side on which the locking mechanism (A) is disposed: the side opposite to the apparatus depth direction X), back plate 55, and shelf plates 56 as those in Embodiment 1. The bottom plate 152, a top plate 153, and a side plate 154 on the other side (the side on which the locking mechanism (D) is provided: the side of the apparatus depth direction X) are different from those of the magazine box 50 in Embodiment 1.

A substantially same mechanical actuation section 61 having resin springs 62 and windows 63 as that in Embodiment 1 is arranged at a part having a predetermined width, near the back plate 55 of the side plate 54 on the side on which the locking mechanism (A) is arranged (the side opposite to the apparatus depth direction X). A substantially same claw rotating shaft 65 formed by vertically arranging plurality of locking claws (C) 64 in an integral manner as that in Embodiment 1 is arranged on the outer side of the mechanical actuation section 61.

The claw rotating shaft 65 is configured by providing the plurality of locking claws (C) 64 integrally with an outer circumference of a sleeve 65s vertically divided into three, for example, and inserting a shaft core member 65c into the sleeve 65s to unite them. Although not specifically shown in Embodiment 1, the configuration of the claw rotating shaft 65 is as described above. The configuration of fixing the claw rotating shaft 65 to the magazine boxes 150 by use of the hole 53h of the top plate 153, the hole 52h of the bottom plate 152, and the cut washers 66a, 66b is the substantially same as that in Embodiment 1.

In place of the rotating gear 67 in Embodiment 1, a link member 77 (coupling link) is fixedly attached to a lower end of the claw rotating shaft 65 supported by the hole 52h of the bottom plate 152 in an integral manner. A pin 77p (coupling pin) protruding downward is provided integrally with a lower surface of a front end of the coupling link 77.

Figure 23:
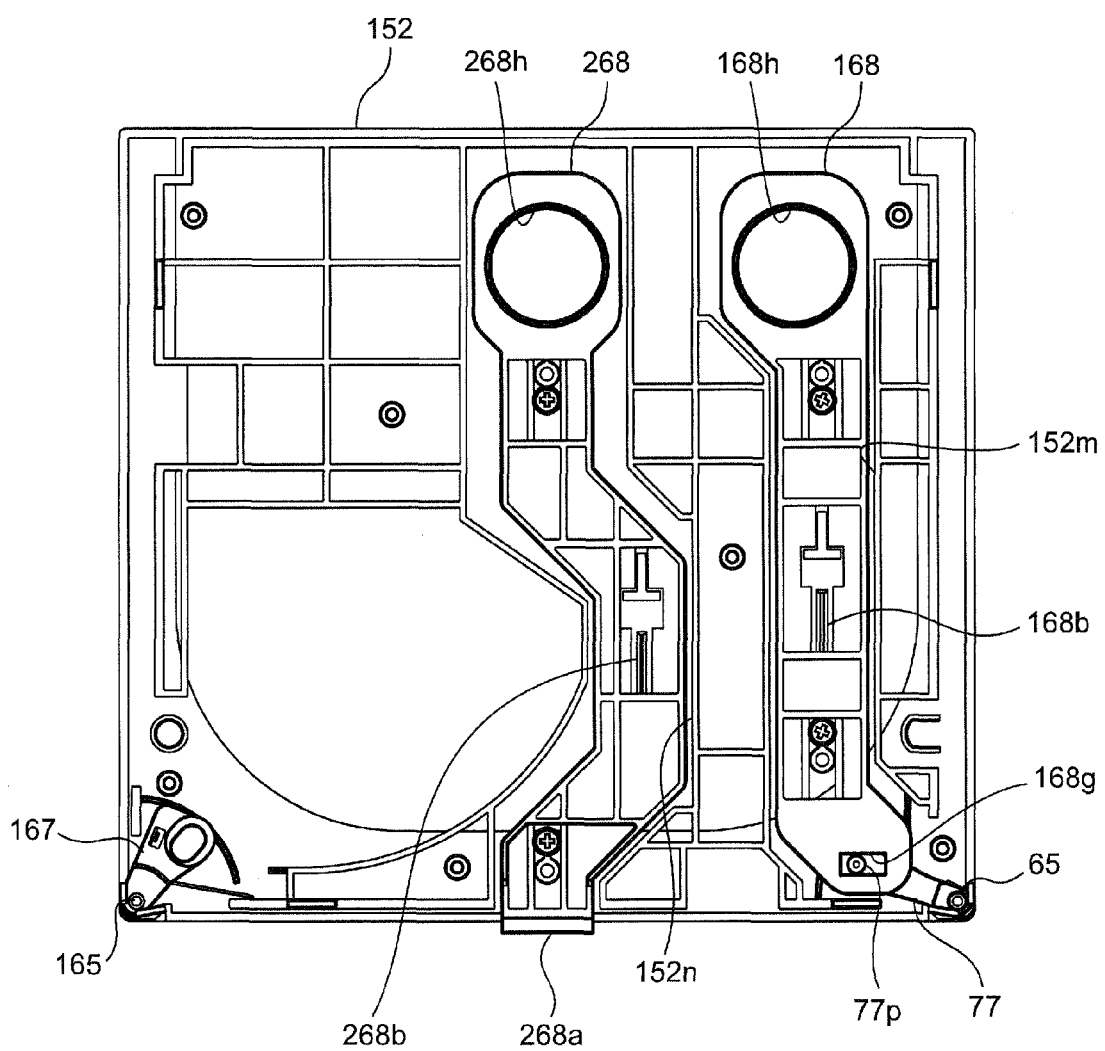
FIG. 23 is a bottom view showing an operating lever of the magazine box in FIG. 22.

FIG. 23 is a bottom view of the magazine box 150, and as shown in this figure, an operating lever 168 for rotating the claw rotating shaft 65 is arranged on the back surface of the bottom plate 152 of the magazine box 150. A groove 152m having a predetermined width, which extends in parallel to the side plates 54, 154 on the whole, is formed in the back surface of the bottom plate 152 of the magazine boxes 150, and the operating lever 168 is slidably stored in the groove 152m. The coupling pin 77p of the coupling link 77 is rotatably and slidably engaged with a long groove 168g formed in the front end of the operating lever 168.

As same as Embodiment 1, the operating lever 168 is provided with a biasing spring 169 (hereinafter referred to as biasing spring (C)) for biasing the operating lever 168 in the locking direction. The biasing spring (C) 169 is formed of, for example, a coil spring, and is attached to a spring attachment part 168b provided, for example, in the middle of the operating lever 168. In Embodiment 2 like Embodiment 1, the locking claws (C) 64, the claw rotating shaft 65, and the biasing spring (C) 169 constitute main parts of the locking mechanism (C), and the locking mechanism (C) corresponds to a "second locking mechanism" in this disclosure.

The user performing a pulling operation with his/her finger hanging on an operating hole 168h of the operating lever 168, thereby drawing the operating lever 168 against the biasing force of the biasing spring (C) 169 by a predetermined amount and thus, the coupling link 77 rotates in a predetermined direction (clockwise direction in FIG. 23). Thereby, as in Embodiment 1, the claw rotating shaft 65 and the locking claws (C) 64 rotate in a predetermined direction (locking release direction) and then the claw front ends 64a are put into the locking released position (refer to FIG. 18D (a)). By sliding the operating lever 168 in the locking release direction against the biasing force of the biasing spring (C) 169 in this manner, the magazine 2 together with the case 22 can be ejected while keeping the sliding position. In Embodiment 2, the coupling link 77 having the coupling pin 77p is used for driving the claw rotating shaft 65. However, the rotating gear 67 in Embodiment 1 may be used in place of the coupling link 77.

A locking release lever 268 is arranged lateral to the operating lever 168 on the back surface of the bottom plate 152 of the magazine box 150. The locking release lever 268 is slidably stored in a groove 152n substantially parallel to the groove 152m for the operating lever 168. Further, the locking release lever 268 is provided with a return spring 269 for applying the biasing force in the direction of returning the lever 268 to a lever initial position when operating the lever 268. The return spring 269 is attached to a spring attachment part 268b provided, for example, in the middle of the locking release lever 268.

After the locking release lever 268 and the operating lever 168 are arranged on the back surface of the bottom plate 152 of the magazine box 150, the back surface of the bottom plate 152 is covered with a bottom plate cover 79. The bottom plate cover 79 has openings 79a, 79b, 79c corresponding to the operating holes 168h, 268h of the levers 168, 268 and the above-mentioned link cover 186, respectively.

As shown in FIG. 19, a long groove-like locking slot 194h is formed in the vicinity of the lower end of the back plate 194 and in each of the areas 192a to 192e of the bottom plate 192 of the stocker chassis 191. A locking claw 268a having a well-known tapered configuration is provided at a lower part of a front end of the locking release lever 268.

When the user presses the magazine box 150 on the bottom plate 192 of the stocker chassis 191 toward the back plate 194 for positioning, the locking claw 268a at the lower part of the front end of the locking release lever 268 is fitted into the locking slot 194h of the back plate 194 along the tapering and is locked. Thus, the user can reliably detect that the magazine box 150 is positioned in the stocker chassis 191 on the basis of a click feeling caused by engagement between the locking claw 268a and the locking slot 194h.

When the magazine box 150 thus positioned is ejected from the stocker chassis 191, the user performs the pulling operation with his/her finger hanging on an operating hole 268h of the locking release lever 268. Then, the locking claw 268a is escaped from the locking slot 194h due to the tapering action to release the locked state, enabling smooth ejection of the magazine boxes 150 without trouble.

Again with reference to FIG. 22, the locking mechanism (D) is provided on the opposite side to the side on which the locking mechanism (A) of the magazine box 150 is arranged (side of the apparatus depth direction X). The locking mechanism (D) is to unremovably lock the magazine tray 21 to a case 122 in the state where the magazine box 150 is not located at the predetermined position of the disc apparatus, and to release the locked state of the magazine tray 21 to the case 122 when the magazine box 150 is located at the predetermined position.

Figure 24A:
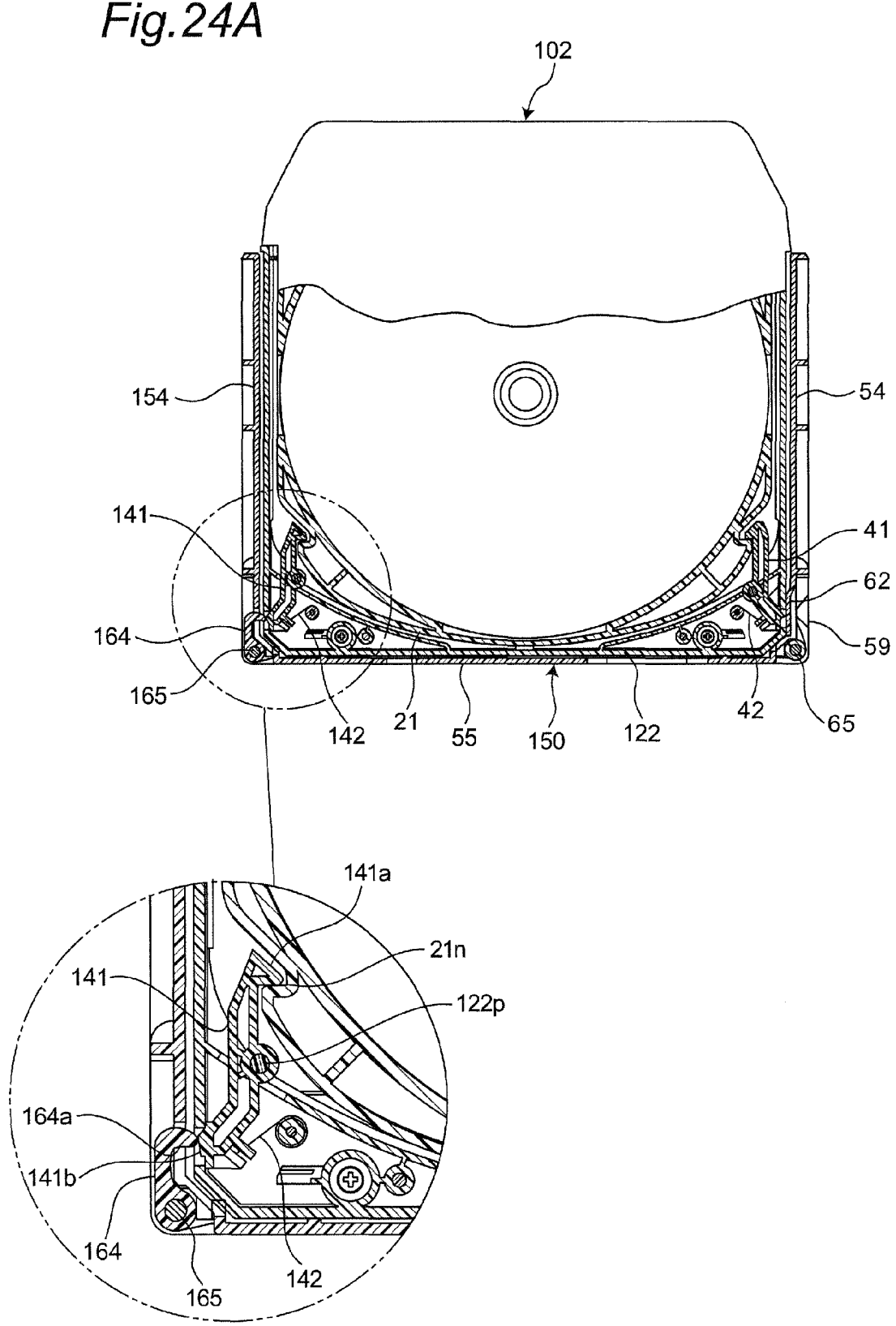
FIG. 24A is a transverse cross-sectional view showing the magazine and the magazine box in which the locking mechanisms (A) and (D) are in the locked state.
Figure 24B:
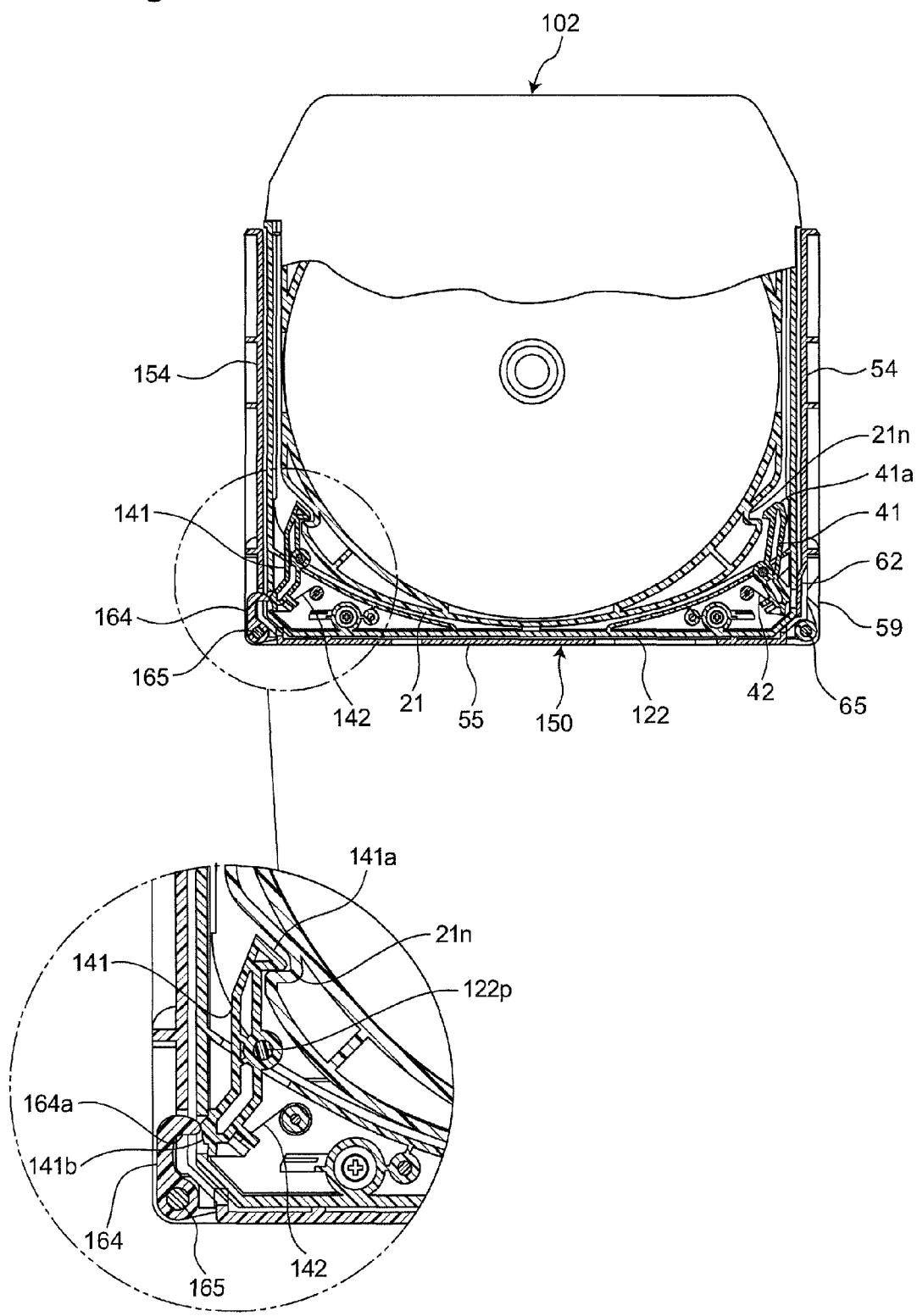
FIG. 24B is a transverse cross-sectional view showing he magazine and the magazine box in which only the locking mechanism (A) is in the locking released state and the locking mechanism (D) is in the locked state.
Figure 25:
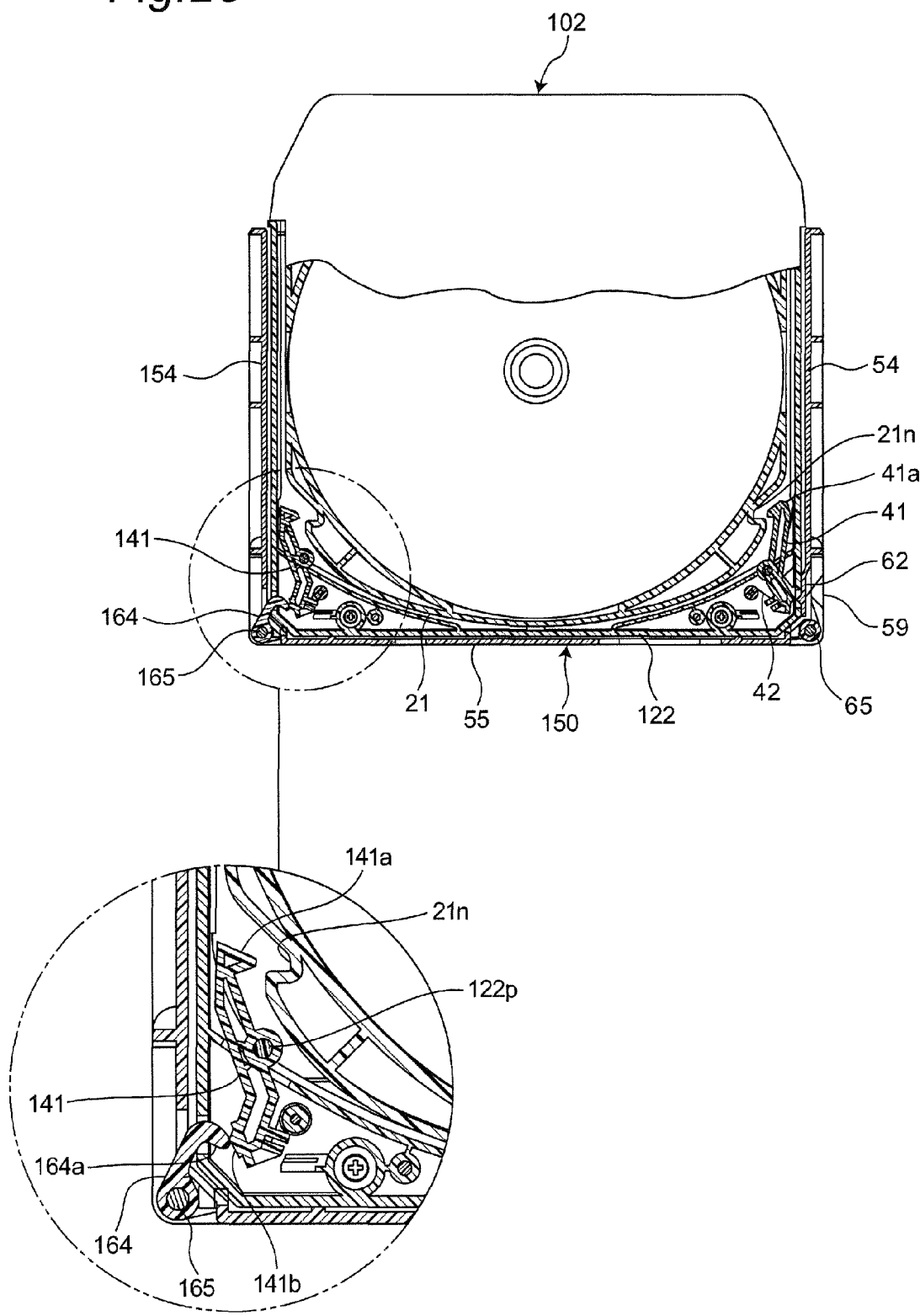
FIG. 25 is a transverse cross-sectional view showing the magazine and the magazine box in which both the locking mechanisms (A) and (D) are in the locking released state.

FIGS. 24A, 24B and 25 are transverse cross-sectional views showing the locking mechanisms (A) and (D) of the magazines 102 and the magazine box 150. As shown in these figures, as in the locking mechanism (A), a locking lever 141 (hereinafter referred to as locking lever (D)) for locking or unlocking the magazine tray 21 to the case 122 is arranged at the corner opposite to the side on which the locking mechanism (A) of the magazines 102 is arranged, and as in the locking mechanism (A), the locking lever (ID) 141 is provided with a biasing spring 142 (hereinafter referred to as biasing spring (D)), which is formed for example, a helical spring, for biasing the locking lever (D) 141 in the locking direction.

The locking lever (D) 141 has a locking claw 141a at one end (upper side in FIGS. 24A, 24B, 25) and a receiving part 141b for receiving the release force from the outside at lock release at the other end (lower side in the figures), and an intermediate part between the both parts 141a, 141b is supported so as to be rotatable about a pivoting pin 122p provided in the case 122.

The supporting configuration of the locking lever (D) 141 and the attachment configuration of the biasing spring (D) 142 are similar to those in the locking mechanism (A). Also, the operation of locking or unlocking the magazine tray 21 with respect to the case 122 by the locking claw 141a with rotation of the locking lever (D) 141 is the same as that in the locking mechanism (A).

A lock releasing claw 164 for releasing the locked state of the magazine tray 21 to the case 122 by means of the locking lever (D) 141 is located on the outer side of the receiving part 141b of the locking lever (D) 141.

As shown in FIG. 22, a claw rotating shaft 165 configured by vertically arranging the plurality of lock releasing claws 164 in an integral manner is disposed on the opposite side to the side on which the locking mechanism (A) of the magazine box 150 is arranged (side of the apparatus depth direction X).

Like the claw rotating shaft 65 of the locking mechanism (A), the claw rotating shaft 165 is configured by providing the plurality of lock releasing claw 164 integrally with an outer circumference of a sleeve 165s vertically divided into three, for example, and inserting a shaft core member 165c into the sleeve 165s to unite them. The fixing configuration of the claw rotating shaft 165 to the magazine box 150 by use of a hole 153h of the top plate 153, a hole (not shown) of the bottom plate 152, and cut washers 166a, 166b is the same as that of the claw rotating shaft 65 of the locking mechanism (A). An outer side of the claw rotating shaft 165 is covered with a flat plate-like cover member 159 formed of, for example, a steel plate. By covering the outer side of the operating mechanism such as the lock releasing claw 164 and the claw rotating shaft 165 with the cover member 159, the appearance of the magazine box 50 is improved.

A return spring 160 for returning the claw rotating shaft 165 to an initial state is attached to a lower side of a lower supporting end of the claw rotating shaft 165. The return spring 160 is formed of, for example, a helical spring. The rotating piece 167 coupled to the link mechanism 183 is integrally fixed to the claw rotating shaft 165.

The locking lever (D) 141, the biasing spring (D) 142, the lock releasing claws 164, and the claw rotating shaft 165 constitute main parts of the locking mechanism (D). The locking mechanism (D) corresponds to a "fourth locking mechanism" (or "third locking mechanism" as appropriate) in this disclosure.

As shown in FIG. 20 and FIG. 21, the pin groove 167g provided in the lower surface of the rotating piece 167 is coupled to a front end of the second link member 185, the engaging pin 185p is moved with the movement of the link mechanism 183, which caused by the operation of the sliding bar 181, to rotate the rotating piece 167 (thus, claw rotating shaft 165).

In other words, in the unset state in which the magazine stocker 101 is not located at the predetermined position of the disc apparatus, the link mechanism 183 is in the state shown in FIG. 20. At this time, the claw rotating shaft 165 is in the initial state in which the claw rotating shaft 165 does not rotate, a claw front end 164a of the lock releasing claw 164 is merely in contact with the receiving part 141b of the locking lever (D) 141.

When the magazine stocker 101 is shifted from the unset state to the set state by positioning at the predetermined position of the disc apparatus Da, as described above, the sliding bar 181 slides, resulting in that the protrusions 181p slides in the long groove 184g of the first link member 184 and the link mechanism 183 is in the state shown in FIG. 21. With the movement of the link mechanism 183, the pin groove 167g of the rotating piece 167 is moved from the position shown in FIG. 20 to the position shown in FIG. 21. Thereby, the rotating piece 167 (thus, claw rotating shaft 165) rotates in the counterclockwise direction. This rotating direction refers to a direction of rotating the lock releasing claw 164 in the clockwise direction in FIGS. 24A, 24B, 25, that is, a direction of pressing the receiving part 141b of the locking lever (D) 141 to release locking of the magazine tray 21 to the case 122 by means of the locking claw 141a.

In the above description, the magazine stocker 101 located on the right side in the apparatus width direction orthogonal to the apparatus depth direction X is shown as an example. In the magazine stocker 101 located on the left side, the rotating direction of the claw rotating shaft 165 at the time when the magazine stocker 101 is in the set state is reversed. Accordingly, in the magazine stocker 101 located on the left side, the locking mechanism (A) and the locking mechanism (D) may be conversely arranged about the apparatus depth direction X. Thus, the same link mechanism 183 can be used for the left and right magazine stockers 101.

Alternatively, by keeping arrangement of the locking mechanism (A) and the locking mechanism (D) unchanged and changing the link mechanism 183 to, for example, a single link, the rotating direction of the claw rotating shaft 165 in the set state can be made the locking release direction of the magazine tray 21 by the locking claw 141a of the locking lever (D) 141. In this case, there is no need to distinguish the magazine box 150 for the left magazine stocker 101 from the right magazine stocker 101.

There will be described change in positioning (set state/unset state) of the magazine stocker 101 with respect to the disc apparatus Da and change in the locked state and the unlocked state of the magazine tray 21 to the case 122 by means of the locking mechanism (D).

First, until the magazine 102 is stored in the magazine box 150, both of the locking mechanism (A) and the locking mechanism (D) lock the magazine tray 21 to the case 122. At this time, the locking mechanism (B) also locks the magazine tray 21 to the case 122.

Next, when the magazine 102 is going to be stored in the magazine box 150, in a state immediately before the magazine 102 is completely stored, and immediately before the resin spring 62 provided on the side of the locking mechanism (A) applies the biasing force in the locking release direction to the locking lever (A) 41, the locking mechanism (A) keeps the locked state of the magazine tray 21 to the case 122, and the magazine tray 21 is locked to the case 122 by the locking mechanism (A) and the locking mechanism (D). FIG. 24A shows the state immediately before the magazine 102 is completely stored.

After that, when the magazine 102 is completely stored in the magazine boxes 150, and the resin spring 62 applies the biasing force in the locking release direction to the locking lever (A) 41, the locking mechanism (A) releases the locked state of the magazine tray 21 to the case 122. At this time, the locking mechanism (D) keeps the locked state of the magazine tray 21 to the case 122. FIG. 24B shows the state in which the magazine 102 is completely stored. In the state where the magazine is completely stored, the locking mechanism (C) locks the case 122 to the magazine box 150.

Next, all of the required magazine boxes 150 are loaded to the stocker chassis 191 of the magazine stocker 101, and the stocker chassis 191 is slid and positioned at a predetermined position of the disc apparatus Da (refer to FIG. 21), to put the magazine stocker 101 into the set state. Thereby, as described above, the locked state of the magazine tray 21 to the case 122 by use of the locking mechanism (D) is released (refer to FIG. 25). In this state, only the locking mechanism (B) locks the magazine tray 21 to the case 122.

As has been described, in Embodiment 2, the magazine box 150 includes the locking mechanism (D) for unremovably locking the magazine tray 21 to the case 122 in the state where the magazine box 150 is not positioned at the predetermined position of the disc apparatus by the positioning member (magazine stocker 101), and releasing the locked state of the magazine tray 21 to the case 122 when the magazine box 150 is positioned at the predetermined position. Accordingly, in the case where the magazine box 150 is not positioned at the predetermined position of the disc apparatus, the magazine tray 21 can be locked to the case 122 more reliably, thereby preventing manual ejection of the magazine tray 21 from the case 122 by the user more reliably.

As publicly known, an extremely high level of security is required for handling and storage of the disc recording valuable contents therein and the magazine storing the disc and therefore, it should be absolutely prevented that persons including the user manually deal such disc and magazine. In both of Embodiment 1 and Embodiment 2 in this disclosure, the various locking mechanisms (A) to (D) can perform locking and unlocking doubly or triply in each handling step and each operating step, thereby preventing the manual operation more reliably.

During use of the magazine boxes 50, 150 thus configured in the disc apparatus, the plurality of discs 100 in each of the magazines 2, 102 are vertically stacked and are supported by the bottom plates 52, 152 so as to be kept substantially horizontally.

However, after use in the disc apparatus Da, in the case where the magazine boxes 50, 150 are ejected from the magazine stockers 1, 101, respectively, and placed on, for example, a shelf in a depository of a data center, and stored for a relatively long term, when the plurality of discs 100 stored in the magazines 2, 102 of the magazine boxes 50, 150 are kept in the vertically stacked state for the long term, the upper and lower discs 100 are air-tightly stacked and fixed firmly to each other due to self-weights of the stacked discs 100, possibly impairing the preservability of information recorded in the discs 100 or the discs 100 themselves to interfere with reproduction of the information.

In this disclosure, during storage after use, the plurality of discs 100 in each of the magazines 2, 102 are kept substantially vertical.

Next, using the magazine box 50 in Embodiment 1 as an example, the storage after use will be described.

Figure 26:
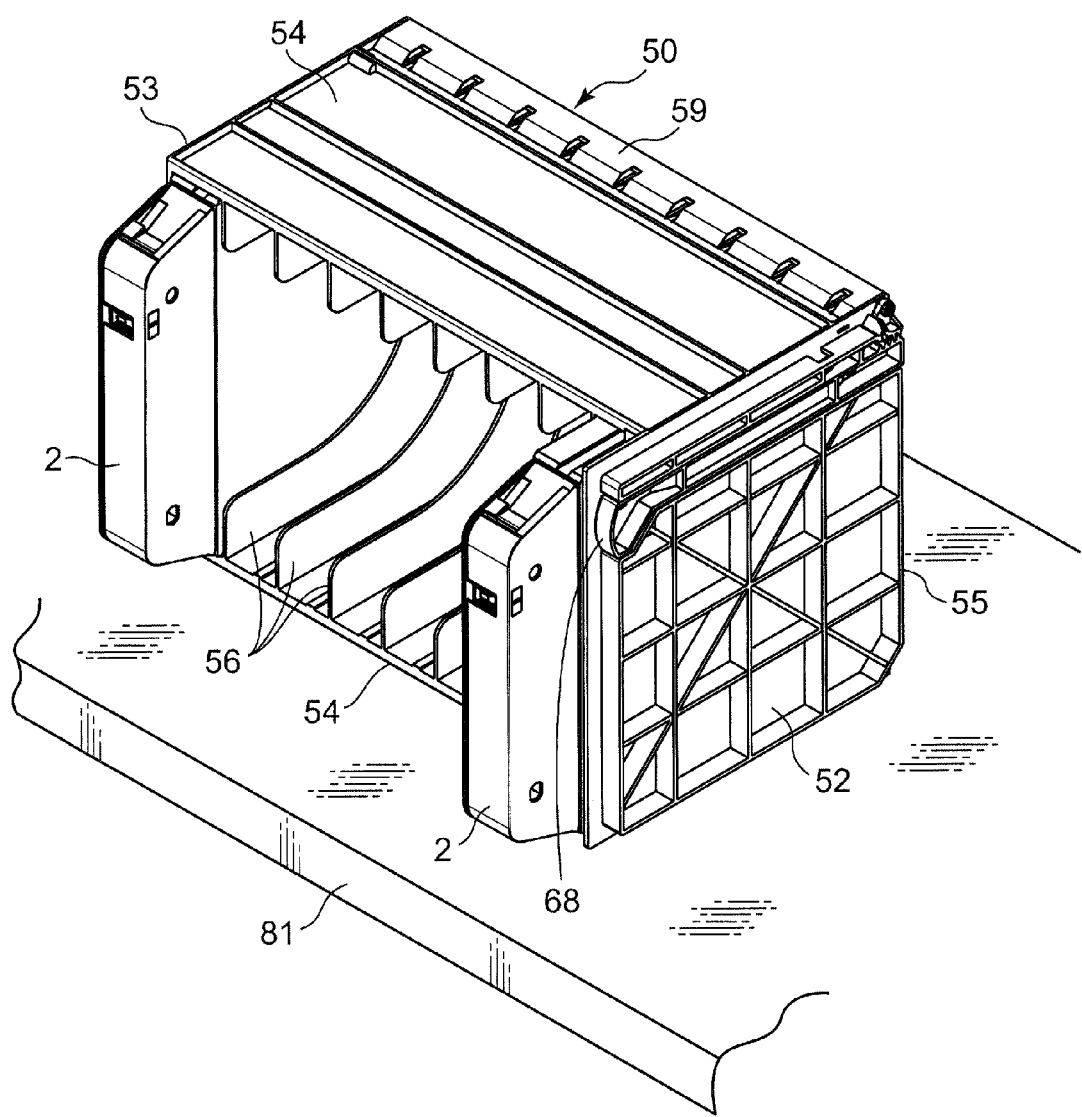
FIG. 26 is a perspective view showing the magazine box that is ejected from the magazine stocker and is in the stored state.

FIG. 26 is a perspective view showing the magazine box 50 that is ejected from the magazine stocker 1 and is in the stored state. As shown in this figure, when the magazine box 50 is stored on a storage shelf 81 in the depository, one of the side plates 54 of the magazine box 50 is placed so as to lie on the storage shelf 81.

Thus, the side plate 54 supports the plurality of vertically oriented magazines 2 stored side-by-side such that the plurality of discs 100 in each of the magazines 2 are kept substantially vertically.

At this time, since the bottom plate 52 of the magazine box 50 is kept on the storage shelf 81 substantially vertically, the operating lever 68 of the third locking mechanism arranged on the back surface of the bottom plate 52 can be easily operated on the storage shelf 81, ensuring a good operability.

When the magazine box 50 is stored on the storage shelf 81, by supporting the magazine box 50 with the box side plate 54, the plurality of vertically oriented magazines 2 can be supported such that the plurality of discs 100 in each of the magazines 2 are kept substantially vertically. Therefore, it can be expected that an air layer is formed between the plurality of discs 100 in each magazine 2, thereby preventing that the upper and lower discs 100 are air-tightly stacked and fixed to each other due to the self-weights of the stacked discs 100 as conventional. Even when the discs 100 are stored for a long term, it is possible to suppress impairment of preservability of information recorded in the discs 100 and the discs 100 themselves.

As described above, since the magazine tray 21 includes the core rod 23 inserted into the central holes 100a of the plurality of stored discs 100, especially during storage, even when the magazine box 50 is supported such that the plurality of discs 100 in each magazine 2 are kept substantially vertically, it can be effectively prevented that the discs 100 are irregularly arranged, and movement of each of the discs 100 in the direction of the disc surface can be restricted, effectively preventing damage of the discs 100.

The application of the storage mode of the magazine box in FIG. 26 is not necessarily limited to the magazine box used in the disc apparatus. Accordingly, even in the case where the first locking mechanism and the second locking mechanism are not provided, the storage mode can be effectively applied to enhance the preservability of the discs during long-term storage.

In the above-described embodiments, the operation of each constituent component of the disc apparatus Da such as picker 3, disc drive 4, carrier 6 (the operation of motor etc.) is controlled by the controller 9 provided in the control unit 7 includes electric circuits, power source and the like. The controller 9 is connected, for example, to a host computer which manages the data. Based on instructions from operator, the host computer sends commands to the controller 9 so as to perform operations such as data reading from or writing on the specified magazine 2. Based on the commands, the controller 9 controls the operation of each constituent component of the disc apparatus Da such as picker 3, disc drive 4, carrier 6 and the like.

Figure 27:
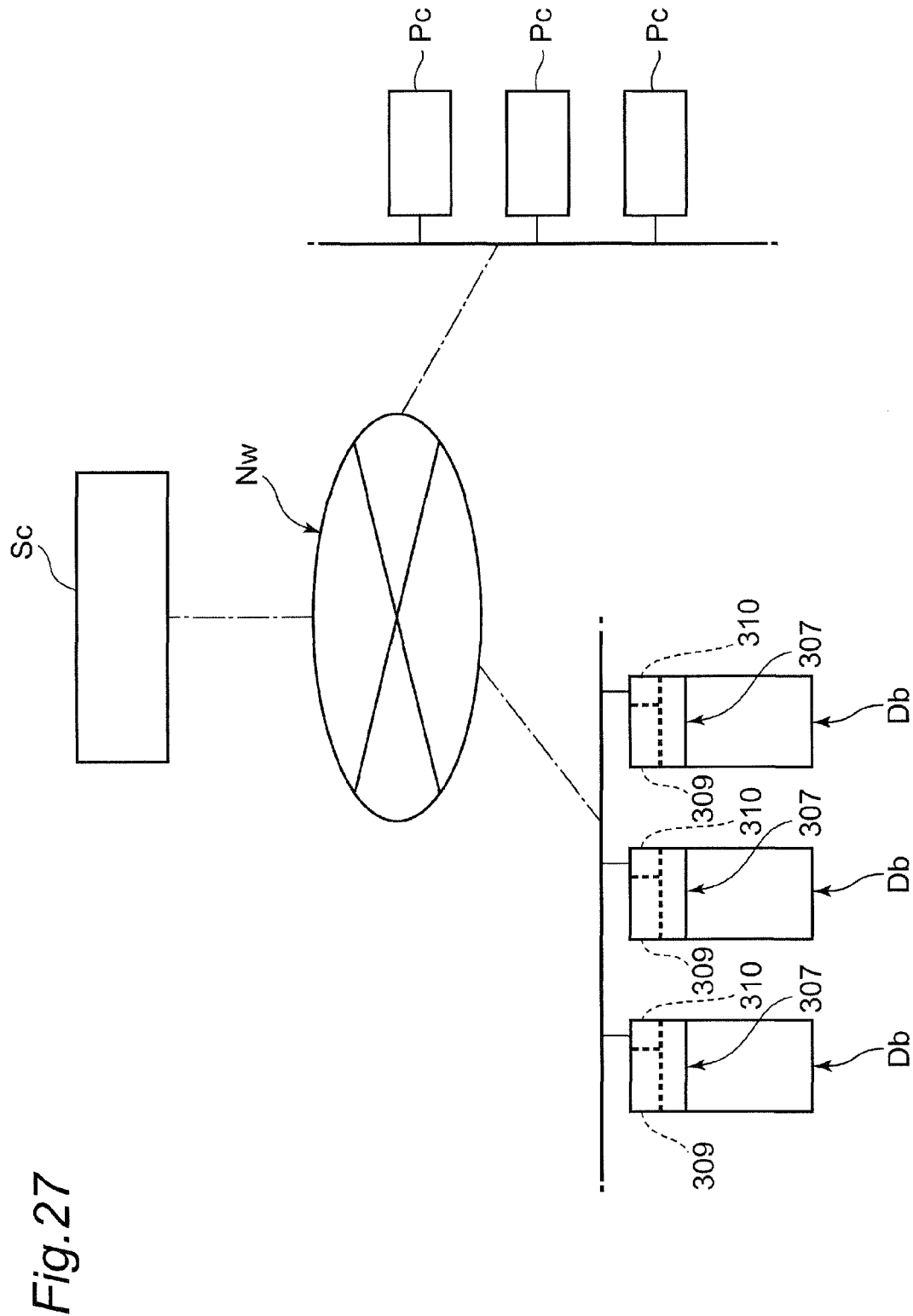
FIG. 27 is a diagram schematically showing a system configuration example for controlling the disc apparatus through a cloud computing system.

Such a control may be conducted by using so-called a "cloud computing system". FIG. 27 is a diagram schematically showing a system configuration example for controlling the disc apparatus through a cloud computing system.

As shown in FIG. 27, the cloud computing system includes a server Sc (so-called "cloud server") which is accessible through a network Nw. In this case, the disc apparatus Db includes a network communication section 310, for example, in a control unit 307. By virtue of this network communication section 310, the disc apparatus Db is accessibly connected to the cloud server Sc via the network Nw and is capable of communicating with the cloud server Sc. Such the network communication section 310 may be provided within the control unit 307 of the disc apparatus Db as explained above, or it may be separately provided from the control unit 307.

A user terminal equipment Pc capable of operating the disc apparatus Db is accessibly connected to the cloud server Sc via the network Nw and is capable of communicating with the cloud server Sc. A so-called "personal computer" having a microcomputer as a major part and a communication function may be employed as the user terminal equipment Pc, for example.

The cloud server Sc reserves, for example, at least a part of a program for execution of required controls and/or calculations which should be conducted by using the user terminal equipment Pc. Further, the cloud server Sc may store at least a part of a data and the like which are necessary for the execution of such the controls and/or the calculations. And, a required program and/or data may be downloaded and utilized, on a case-by-case basis, by request from user.

As shown in FIG. 27, a plurality of the above-described user terminal equipment Pc may be connected to the network Nw. Further, a plurality of the disc apparatus Db may be connected to the network Nw and respectively controlled.

It is to be noted that the above-described disc apparatus Db has the similar configuration and function to those of the aforementioned disc apparatus Da, except the point that it includes the network communication section 310 and is controlled by using the cloud server Sc.

By utilizing such the cloud computing system, it may be possible to simplify the constitution of the disc apparatus, the user terminal equipment and/or a memory device attached thereto, in contrast with the conventional case where the programs and/or the data are stored in those disc apparatus, user terminal equipment and/or memory device. In a case where the programs and/or the data are inevitably bloated, the remarkable benefits may be obtained.

It is to be noted that the cloud server Sc may be used as a data backup of the disc apparatus Db, instead of or in addition to the purpose for the execution of the calculations and/or the controls of the disc apparatus Db.

The embodiments have been described as technical examples of this disclosure. Appended figures and detailed description are provided.

Therefore, components shown and described in the appended figures and detailed description may include components indispensable for solving the problems as well as components that is not indispensable for solving the problems and illustrate the above-mentioned technique. For this reason, even if such non-essential components are described in the appended figures and detailed description, it should not conclude that the non-essential components are indispensable.

The above-mentioned embodiments serve to illustrate the technique in this disclosure and therefore, various changes, replacements, addition, and omission can be made within the scope of Claims and their equivalents.

INDUSTRIAL APPLICABILITY

This disclosure is effective for the magazine box for removably storing the plurality of disc-storing magazines, and for the magazine box used, for example, in the disc apparatus for feeding the disc to each of the plurality of disc drives.

What is claimed is:

1. A magazine box for removably storing a plurality of disc-storing magazines used in a disc apparatus for feeding a disc to each of a plurality of disc drives,
    wherein the magazines each include a tray for storing the disc, a case for removably storing the tray, and a first locking mechanism for releasably locking the tray to the case,
    the first locking mechanism is configured to lock the tray to the case under a normal condition in which the tray is to be stored in the case, and to release a locked state with an automatic tray-ejection from the case in the disc apparatus when the automatic tray-ejection from the case in the disc apparatus is conducted,
    the magazine box includes a second locking mechanism for releasably locking the case of each of the plurality of magazines to the magazine box, and the second locking mechanism maintains the locked state at least during while the automatic tray-ejection from the case in the disc apparatus is conducted.

2. The magazine box according to claim 1,
    wherein the second locking mechanism includes a plurality of locking members that are engageable with the respective cases of the plurality of magazines stored in the magazine box, and the magazine box includes an operating member configured to simultaneously operate the plurality of locking members in a locking release direction.

3. The magazine box according to claim 2,
    wherein the magazine box is mounted with a box bottom surface being on a lower side such that the plurality of magazines are vertically stacked and stored, and the operating member is disposed on the box bottom surface, at least while the automatic tray-ejection from the case in the disc apparatus is conducted.

4. The magazine box according to claim 1,
    wherein the magazine box further comprises a third locking mechanism for unremovably locking the tray to the case in a state in which the magazine is not stored in the magazine box, and for releasing the locked state of the tray to the case when the magazine is normally stored in the magazine box.

5. The magazine box according to claim 4,
    wherein the magazine box further comprises a biasing member configured to bias a locking member of the third locking mechanism in the locking release direction when the magazine is normally stored in the magazine box.

6. The magazine box according to claim 5,
    wherein the biasing member simultaneously biases the locking members of the third locking mechanisms of the plurality of magazines stored in the magazine box in the locking release direction.

7. The magazine box according to claim 1,
wherein the disc apparatus includes a positioning member for positioning the magazine box at a predetermined position of the disc apparatus, and the magazine box includes a third locking mechanism for unremovably locking the tray to the case in a state where the magazine box is not positioned at the predetermined position, and for releasing the locked state of the tray to the case when the magazine box is positioned at the predetermined position.

8. The magazine box according to claim 1,
wherein the tray includes a shaft to be inserted into a central hole of each of the plurality of stored discs.

9. The magazine box according to claim 1, further comprising:

a box bottom surface for supporting the plurality of magazines in a vertically-stacked and stored state such that the discs in each of the magazines are kept substantially horizontal during usage;

a box side surface for supporting the plurality of magazines arranged in a vertical orientation such that the discs in each of the magazines are kept substantially vertical during storage; and a locking mechanism for releasably locking the case of each of the magazines, the locking mechanism being disposed on the box bottom surface, and maintaining the locked state at least during usage.

10. The magazine box according to claim 9,
wherein the tray includes a shaft to be inserted into a central hole of each of the plurality of stored discs.

\* \* \* \* \*